(12) United States Patent
Hayashi

(10) Patent No.: US 11,292,699 B2
(45) Date of Patent: Apr. 5, 2022

(54) REMOTE OPERATION TERMINAL AND WORK VEHICLE PROVIDED WITH REMOTE OPERATION TERMINAL

(71) Applicant: TADANO LTD., Kagawa (JP)

(72) Inventor: Hiroyuki Hayashi, Kagawa (JP)

(73) Assignee: TADANO LTD., Kagawa (JP)

( * ) Notice: Subject to any disclaimer, the term of this patent is extended or adjusted under 35 U.S.C. 154(b) by 363 days.

(21) Appl. No.: 16/466,837

(22) PCT Filed: Dec. 15, 2017

(86) PCT No.: PCT/JP2017/045198
§ 371 (c)(1),
(2) Date: Jun. 5, 2019

(87) PCT Pub. No.: WO2018/110707
PCT Pub. Date: Jun. 21, 2018

(65) Prior Publication Data
US 2019/0322496 A1     Oct. 24, 2019

(30) Foreign Application Priority Data

Dec. 15, 2016   (JP) .............................. JP2016-243298
Dec. 15, 2017   (JP) .............................. JP2017-240646

(51) Int. Cl.
*B66C 13/40*   (2006.01)
*H04N 7/18*    (2006.01)
(Continued)

(52) U.S. Cl.
CPC ................ *B66C 13/40* (2013.01); *B60R 1/00* (2013.01); *B66C 23/42* (2013.01); *H04N 7/183* (2013.01);
(Continued)

(58) Field of Classification Search
CPC ....... B60R 1/00; B60R 2300/50; B66C 13/40; B66C 13/46; B66C 13/48; B66C 23/42;
(Continued)

(56) References Cited

U.S. PATENT DOCUMENTS 5,043,646 A     8/1991   Smith, III et al.
2003/0164349 A1   9/2003   Kohlenberg
2014/0278078 A1*  9/2014   Cameron ................ B66C 13/46
                                                      701/480

FOREIGN PATENT DOCUMENTS

EP     1939134 A2    7/2008
JP     H01-275870 A  11/1989
(Continued)

OTHER PUBLICATIONS

Jul. 24, 2020, European Search Report issued for related application No. 17880553.7.

(Continued)

*Primary Examiner* — Joon Kwon
(74) *Attorney, Agent, or Firm* — Paratus Law Group, PLLC

(57) ABSTRACT

A remote operation terminal is provided with: a terminal-side control device configured so as to be capable of communicating with a control device, the terminal-side control device being a control unit for controlling the actuation of the remote operation terminal; a suspended load movement operation tool, which is a first operation unit for remotely operating a crane device; and a reference change operation tool, which is a second operation unit for setting an operation direction reference of the suspended load movement operation tool in relation to a vehicle direction reference of a crane. The terminal-side control device calculates the actuation direction of the crane device in relation to the operation of the suspended load movement operation (Continued)

tool, on the basis of a setting value of the reference change operation tool, and transmits the actuation direction to the control device.

11 Claims, 24 Drawing Sheets

(51) Int. Cl.
    *B66C 23/42*     (2006.01)
    *B60R 1/00*     (2022.01)

(52) U.S. Cl.
    CPC ... *B60R 2300/50* (2013.01); *B66C 2700/0371* (2013.01)

(58) Field of Classification Search
    CPC .......... B66C 23/702; B66C 2700/0371; H04N 7/183
    See application file for complete search history.

(56) References Cited

FOREIGN PATENT DOCUMENTS

| JP | H09-071386 A | 3/1997 |
|---|---|---|
| JP | 2010-228905 A | 10/2010 |
| JP | 2011-207571 A | 10/2011 |

OTHER PUBLICATIONS

Feb. 13, 2018, International Search Report issued for related PCT Application No. PCT/JP2017/045198.

Feb. 13, 2018, International Search Opinion issued for related PCT Application No. PCT/JP2017/045198.

\* cited by examiner

REMOTE OPERATION TERMINAL AND WORK VEHICLE PROVIDED WITH REMOTE OPERATION TERMINAL

CROSS REFERENCE TO PRIOR APPLICATION

This application is a National Stage Patent Application of PCT International Patent Application No. PCT/JP2017/045198 (filed on Dec. 15, 2017) under 35 U.S.C. § 371, which claims priority to Japanese Patent Application Nos. 2016-243298 (filed on Dec. 15, 2016) and 2017-240646 (filed on Dec. 15, 2017), which are all hereby incorporated by reference in their entirety.

TECHNICAL FIELD

The present invention relates to a remote operation terminal and a work vehicle provided with a remote operation terminal.

BACKGROUND ART

In work vehicles provided with work apparatuses, such as mobile cranes and/or aerial work platforms, there have been proposed, work vehicles in which actuators of work apparatuses are remotely operated, and remote operation terminals which operate actuators of work apparatuses. In carrying out work using a remote operation terminal, an operator can perform a remote operation while checking a movement state of a suspended load, in the vicinity of the suspended load away from an operation apparatus of the work apparatus or at a movement target position of the suspended load.

In the work vehicle configured in this way, a relative positional relationship between the work apparatus and the remote operation terminal varies depending on an operation state. In a case where an operation direction of the work apparatus for an operation direction of an operation tool of the remote operation terminal is fixed, the operation direction of the operation tool of the remote operation terminal and the operation direction of the work apparatus operated by the remote operation terminal do not coincide with each other in the work vehicle in some cases. For this reason, the operator who operates the work apparatus by using the remote operation terminal needs to operate the operation tool of the remote operation terminal while always considering a relative positional relationship between the work apparatus and the remote operation terminal. In this respect, a remote operation terminal is known, which allows the operation of the work apparatus to be easily and simply performed by causing the operation direction of the operation tool of the remote operation terminal and the operation direction of the work apparatus to coincide with each other, regardless of the relative positional relationship between the work apparatus and the remote operation terminal. For example, PTL 1 describes the same.

A remote operation apparatus (remote operation terminal) described in PTL 1 has a signal transmission section that transmits a laser beam having high linearity, as a reference signal. In addition, a control apparatus on a work machine (work apparatus) side has a reception section for the reference signal. The remote operation apparatus is configured such that a reference coordinate system of the operation tool and a transmitting direction of the reference signal coincide with each other. The control apparatus on the work machine side identifies a direction of the remote operation apparatus by receiving the reference signal from the remote operation apparatus with the reception section, and causes the coordinate system of the work machine and the coordinate system of the remote operation apparatus to coincide with each other. In this manner, the operation direction of the operation tool of the remote operation apparatus and the operation direction of the work machine coincide with each other. Accordingly, regardless of the relative positional relationship between the work machine and the remote operation apparatus, the work machine can be easily and simply operated using the remote operation apparatus.

However, the work machine described in PTL 1 utilizes directivity of the reference signal received by the control apparatus to identify a relative direction of the remote operation apparatus with respect to the work machine, and causes the reference coordinate system of the operation tool and the coordinate system of the work machine to coincide with each other. Consequently, the coordinate system cannot be set in consideration of a work site state or a work state, or the coordinate system cannot be set in accordance with the operator's preference. In addition, in a case where a reception state of the reference signal is poor, there arises a problem in that the reference coordinate system of the operation tool and the coordinate system of the work machine cannot coincide with each other.

In addition, in a work vehicle, such as a mobile crane and/or an aerial work platform, a remote operation terminal for remotely operating an actuator has been proposed. When carrying out work using the remote operation terminal, the operator can carry out the work while checking a movement state of a suspended load, at a position close to the suspended load away from a vehicle body or at a target position of the suspended load.

When performing the work using the remote operation terminal, the operator needs to move the suspended load suspended from a distal end of the boom to the target position as accurately as possible. For example, PTL 2 discloses the following technique: an imaging apparatus is movably mounted on the work vehicle, and a captured image thereof is transmitted to the operator. In this manner, the operator can be accurately informed of a surrounding status of the suspended load.

However, in the remotely operated work, the remote operation terminal is operated at a position away from the work vehicle. Accordingly, the relative positional relationship constantly varies between the work vehicle and the remote operation terminal. In this case, the operator himself or herself operates the remote operation terminal while carefully considering a movement direction of the suspended load based on the work vehicle in his or her head.

CITATION LIST

Patent Literature

PTL 1
Japanese Patent Application Laid-Open No. 2010-228905
PTL 2
Japanese Patent Application Laid-Open No. H01-275870

SUMMARY OF INVENTION

Technical Problem

An object of the present invention is thus to provide a remote operation terminal and a work vehicle provided with a remote operation terminal which can easily and simply perform a remote operation on a work apparatus in accordance with a work condition.

Solution to Problem

The problems to be solved by the present invention are as described above, and means for solving the problems will be described, next.

More specifically, the present invention provides a remote operation terminal for a work vehicle including a work apparatus and a control apparatus, the remote operation terminal including: a control section configured to be capable of communicating with the control apparatus and to control an operation of the remote operation terminal; a first operation section that remotely operates the work apparatus; and a second operation section that sets a reference for the first operation section with respect to a reference for the work vehicle, in which the control section calculates an operation direction of the work apparatus with respect to an operation of the first operation section, based on a set value of the second operation section, and transmits the operation direction of the work apparatus to the control apparatus.

The present invention provides the remote operation terminal in which the second operation section sets an angle from the reference for the work vehicle to the reference for the first operation section.

The present invention provides the remote operation terminal in which the second operation section sets the reference for the work vehicle and the reference for the first operation section based on an azimuth or terrain information.

The present invention provides the remote operation terminal further including: a display section that displays an image indicating the reference for the work vehicle, in which the control section causes the display section to display the image indicating the reference for the work vehicle in conjunction with an operation of the second operation section.

The present invention provides a work vehicle provided with a remotely operated work apparatus, the work vehicle including: a remote operation terminal including a first operation section that remotely operates the work apparatus, and a second operation section that sets a reference for the first operation section with respect to a reference for the work vehicle; and a control apparatus configured to be capable of communicating with a control section of the remote operation terminal and to control an operation of the work apparatus, in which the control apparatus or the control section calculates an operation direction of the work apparatus with respect to an operation of the first operation section, based on a set value of the second operation section, and the control apparatus causes the work apparatus to operate in the calculated operation direction.

The present invention provides a remote operation terminal that remotely operates an operation of a work vehicle including a work apparatus, a control apparatus, and a detection apparatus, the remote operation terminal including: a control section configured to be capable of communicating with the control apparatus and to control an operation of the remote operation terminal; a display section for displaying an image generated based on detection information of the detection apparatus; a first operation section for remotely operating the work apparatus; and a second operation section for rotationally operating the image displayed on the display section.

Advantageous Effects of Invention

The present invention brings about the following advantageous effects.

According to the present invention, the reference for the first operation section for the reference for the work vehicle is optionally set by the second operation section without recognizing the relative position of the remote operation terminal with respect to the work apparatus. In this manner, it is possible to easily and simply perform a remote operation on the work apparatus in accordance with a work condition.

According to the present invention, the reference for the first operation section is optionally set using the relative angle with respect to the reference for the work vehicle. Accordingly, it is easy to recognize a movement direction of a suspended load. In this manner, it is possible to easily and simply perform the remote operation on the work apparatus in accordance with the work condition.

According to the present invention, the reference for the first operation section and the reference for the work vehicle are optionally set, based on the azimuth or the terrain information. Accordingly, it is easy to objectively recognize the movement direction of the suspended load. In this manner, it is possible to easily and simply perform the remote operation on the work apparatus in accordance with the work condition.

According to the present invention, the reference for the first operation section with respect to the reference for the work vehicle is displayed in the remote operation apparatus. Accordingly, it is easy to recognize a relationship between the reference for the work vehicle and the reference for the first operation section. In this manner, it is possible to easily and simply perform the remote operation on the work apparatus in accordance with the work condition.

According to the present invention, the remote operation terminal includes the second operation section for rotationally operating the image displayed on the display section. The operator recognizes that the actually viewed movement direction of the suspended load and the operation direction of the remote operation terminal coincide with each other. In this manner, it is possible to easily and simply perform the remote operation on the work apparatus in accordance with the work condition.

DESCRIPTION OF EMBODIMENTS

Hereinafter, crane 1 which is a mobile crane (terrain crane) serving as work vehicle 2 according to Embodiment 1 of the present invention will be described with reference to FIGS. 1 and 2. In the present embodiment, crane 1 (terrain crane) will be described as work vehicle 2. However, the crane 1 may be an all-terrain crane, a truck crane, a loading truck crane, or a high lift work vehicle.

Figure 1:
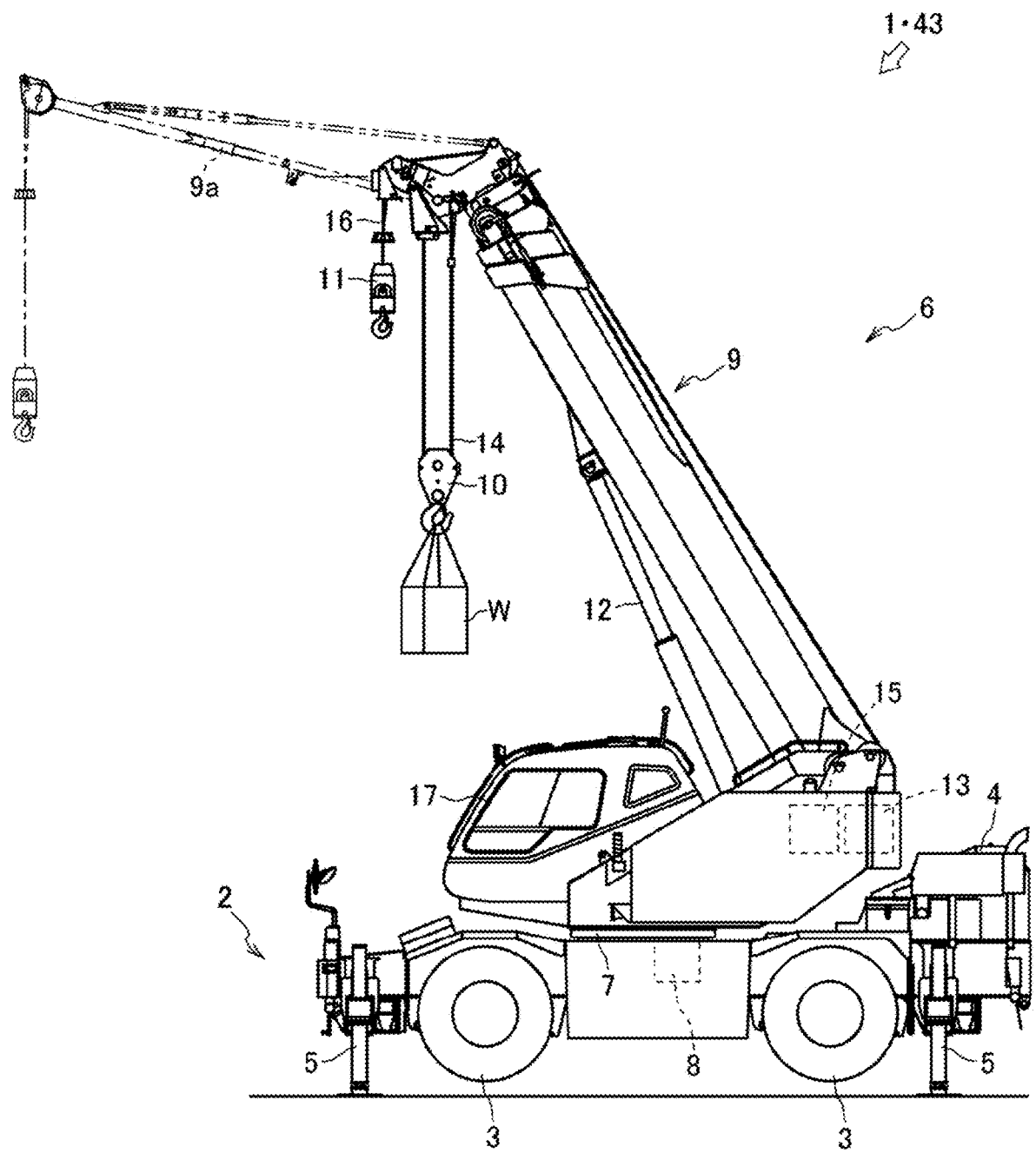
FIG. 1 is a side view illustrating an overall configuration of a crane.

As illustrated in FIG. 1, crane 1 is the mobile crane which is movable in an unspecified place. Crane 1 has vehicle 2, crane apparatus 6 serving as a work apparatus, and remote operation terminal 32 (see FIG. 2) which can remotely operate crane apparatus 6.

Vehicle 2 transports crane apparatus 6. Vehicle 2 has a plurality of vehicle wheels 3, and travels using engine 4 as a power source. Vehicle 2 has outrigger 5. Outrigger 5 is configured to include a hydraulically extendable projecting beam on both sides in a width direction of vehicle 2, and a hydraulic jack cylinder extendable in a direction perpendicular to a ground surface. Vehicle 2 can broaden a working range of crane 1 by causing outrigger 5 to extend in the width direction of vehicle 2 and by connecting the jack cylinder to the ground.

Crane apparatus 6 hoists load W by using a wire rope. Crane apparatus 6 includes swivel base 7, boom 9, jib 9a, main hook block 10, sub hook block 11, luffing hydraulic cylinder 12, main winch 13, main wire rope 14, sub winch 15, sub wire rope 16, and cabin 17.

Swivel base 7 is configured so that crane apparatus 6 can swivel. Swivel base 7 is disposed on a frame of vehicle 2 via an annular bearing. Swivel base 7 is configured to be rotatable around a center of the annular bearing. Swivel base 7 has hydraulic swivel hydraulic motor 8 serving as an actuator. Swivel base 7 is configured to be capable of swiveling in one direction and the other direction by using swivel hydraulic motor 8.

Swivel hydraulic motor 8 serving as the actuator is rotationally operated by swivel valve 23 (see FIG. 2) serving as an electrosurgical proportional control valve. Swivel valve 23 can control a flow rate of hydraulic oil to be supplied to swivel hydraulic motor 8 to any desired flow rate. That is, swivel base 7 is configured to be capable of controlling a swivel speed to any desired swivel speed via swivel hydraulic motor 8 rotationally operated by swivel valve 23. Swivel base 7 has swivel sensor 27 (see FIG. 2) which detects a swivel position (angle) and the swivel speed of swivel base 7.

Boom 9 serving as the boom supports the wire rope in a state in which load W can be hoisted. Boom 9 is configured to include a plurality of boom members. Boom 9 is configured to be extensible and retractable in an axial direction by causing a extending and retracting hydraulic cylinder (not illustrated) serving as the actuator to move the respective boom members. In boom 9, a base end of a base boom member is swingably disposed at a substantially center of swivel base 7.

A extending and retracting hydraulic cylinder (not illustrated) serving as the actuator extends and retracts by extending and retracting valve 24 (see FIG. 2) serving as an electromagnetic proportional control valve. Extending and retracting valve 24 can control a flow rate of the hydraulic oil to be supplied to the extending and retracting hydraulic cylinder to reach any desired flow rate. That is, boom 9 is configured to be controllable to have any desired boom length by extending and retracting valve 24. Boom 9 has extending and retracting sensor 28 for detecting a length of boom 9 and weight sensor 29 (see FIG. 2) for detecting a weight of load W.

Jib 9a broadens a lifting or working radius of crane apparatus 6. Jib 9a is held in a posture extending along a base boom member by a jib support portion disposed in the base boom member of boom 9. A base end of jib 9*a* is configured to be connectable to a jib support portion of a top boom member.

Camera 9*b* serving as a detection apparatus images load W and features around load W. Camera 9*b* is disposed in a distal end portion of boom 9. Camera 9*b* is configured to be capable of imaging load W and features or terrains around the crane vertically from above load W.

In a case of using camera 9*b* as the detection apparatus, it is preferable to capture the image from above in a vertical direction. Even in a case where an operator changes a working position, movement of the suspended load in the vertical direction is likely to be visually confirmed, and the movement of the suspended load in a horizontal direction is less likely to be visually confirmed (particularly, the movement in a rearward direction). Therefore, it is preferable that the image captured from above in the vertical direction is displayed on terminal-side display apparatus 40 of remote operation terminal 32.

In addition, it is preferable that a position for attaching the detection apparatus is located above main hook block 10 in the vertical direction. In this manner, from a viewpoint of the vertical direction, the position of the suspended load suspended by main hook block 10 coincides with the position of the detection apparatus. Accordingly, the operator is likely to recognize a relative positional relationship between the position of the suspended load displayed on terminal-side display apparatus 40 and the position of remote operation terminal 32. However, even in a case where it is difficult to locate the detection apparatus above main hook block 10 in the vertical direction, based on detection information of the detection apparatus, for example, the image may be displayed so that main hook block 10 (that is, the suspended load) is located at the center position of the display region of terminal-side display apparatus 40.

Main hook block 10 and sub hook block 11 hoist load W. Main hook block 10 has a plurality of hook sheaves around which main wire rope 14 is wound, and a main hook which hoists load W. Sub hook block 11 has a sub hook for suspended load W.

Luffing hydraulic cylinder 12 serving as the actuator raises and lowers boom 9, and holds a posture of boom 9. Luffing hydraulic cylinder 12 is configured to include a cylinder portion and a rod portion. In luffing hydraulic cylinder 12, an end portion of the cylinder portion is swingably connected to swivel base 7, and an end portion of the rod portion is swingably connected to the base boom member of boom 9.

Luffing hydraulic cylinder 12 extends and retracts by luffing valve 25 (see FIG. 2) serving as the electromagnetic proportional control valve. Luffing valve 25 can control the flow rate of the hydraulic oil to be supplied to luffing hydraulic cylinder 12 to reach any desired flow rate. That is, boom 9 is configured to be controllable to have any desired luffing speed by luffing valve 25. Boom 9 has luffing sensor 30 (see FIG. 2) for detecting a luffing angle of boom 9.

Main winch 13 and sub winch 15 fastens (winds) and unfastens (unwinds) main wire rope 14 and sub wire rope 16. Main winch 13 is configured so that a main drum around which main wire rope 14 is wound is rotated by a main hydraulic motor (not illustrated) serving as the actuator. Sub winch 15 is configured so that a sub drum around which sub wire rope 16 is wound is rotated by a sub hydraulic motor (not illustrated) serving as the actuator.

The main hydraulic motor is rotationally operated by main valve 26*m* (see FIG. 2) serving as the electromagnetic proportional control valve. Main valve 26*m* can control the flow rate of the hydraulic oil to be supplied to the main hydraulic motor to reach any desired flow rate. That is, main winch 13 controls the main hydraulic motor by using main valve 26*m*, and is configured to be operable at any desired fastening and unfastening speed. Similarly, sub winch 15 controls the sub hydraulic motor by using sub valve 26*s* (see FIG. 2) serving as the electromagnetic proportional control valve, and is configured to be operable at any desired fastening and unfastening speed.

Cabin 17 covers an operator's seat. Cabin 17 is mounted on swivel base 7. The operator's seat (not illustrated) is disposed therein. The operator's seat has an operation tool for operating vehicle 2 to travel, swivel operation tool 18 for operating crane apparatus 6, luffing operation tool 19, extending and retracting operation tool 20, main drum operation tool 21*m*, and sub drum operation tool 21*s* (see FIG. 2). Swivel operation tool 18 can control swivel hydraulic motor 8 by operating swivel valve 23 (see FIG. 2). Luffing operation tool 19 can control luffing hydraulic cylinder 12 by operating lulling valve 25 (see FIG. 2). Extending and retracting operation tool 20 can control the extending and retracting hydraulic cylinder by operating extending and retracting valve 24 (see FIG. 2). Main drum operation tool 21*m* can control the main hydraulic motor by operating main valve 26*m* (see FIG. 2). Sub drum operation tool 21*s* can control the sub hydraulic motor by operating sub valve 26*s* (see FIG. 2).

Communication apparatus 22 receives a control signal from remote operation terminal 32, and transmits control information from crane apparatus 6. Communication apparatus 22 is disposed in cabin 17. When communication apparatus 22 receives the control signal from remote operation terminal 32, communication apparatus 22 is configured to transmit the control signal to control apparatus 31 via a communication line (not illustrated). Communication apparatus 22 is configured to transmit the control information from control apparatus 31 or the image from camera 9*b* to remote operation terminal 32 via a communication line (not illustrated).

Figure 2:
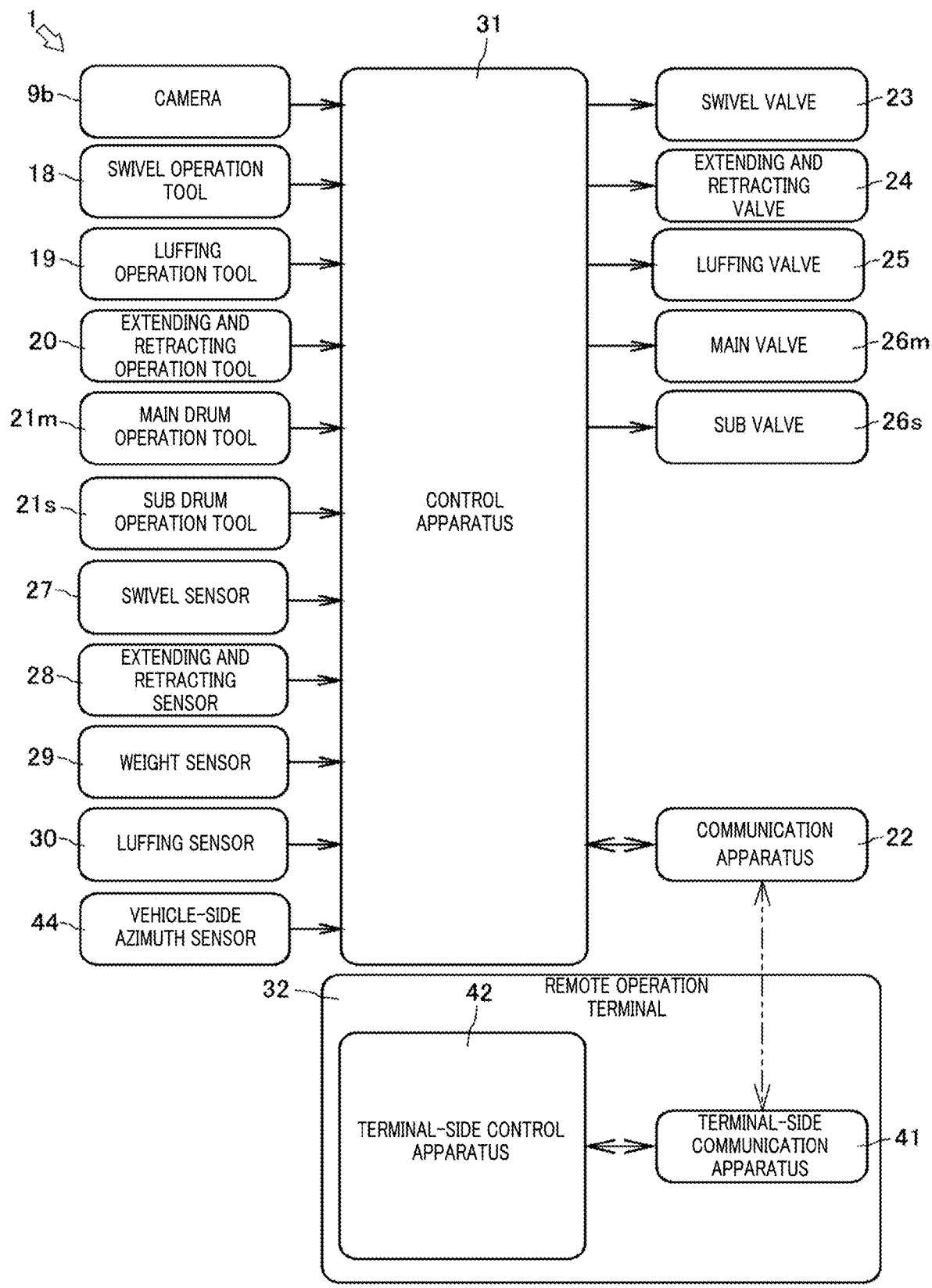
FIG. 2 is a block diagram illustrating a control configuration of the crane.

As illustrated in FIG. 2, control apparatus 31 controls the actuators of crane 1 via the respective operating valves. Control apparatus 31 is disposed inside cabin 17. Control apparatus 31 may be configured so that a CPU, a ROM, a RAM, and an HDD are substantially connected to each other by using a bus, or may be configured to include one chip of an LSI. Control apparatus 31 stores various programs or data for controlling the operations of the respective actuators, switching valves, and sensors.

Control apparatus 31 is connected to camera 9*b*, swivel operation tool 18, luffing operation tool 19, extending and retracting operation tool 20, main drum operation tool 21*m*, and sub drum operation tool 21*s*, and acquires the image of camera 9*b*. In this manner, control apparatus 31 can acquire each operation amount of swivel operation tool 18, luffing operation tool 19, main drum operation tool 21*m*, and sub drum operation tool 21*s*.

Control apparatus 31 is connected to swivel valve 23, extending and retracting valve 24, luffing valve 25, main valve 26*m*, and sub valve 26*s*, and can transmit the control signal to swivel valve 23, luffing valve 25, main valve 26*m*, and sub valve 26*s*.

Control apparatus 31 is connected to swivel sensor 27, extending and retracting sensor 28, weight sensor 29, and luffing sensor 30, and can acquire a swivel position of swivel base 7, a boom length, a luffing angle, and a weight of load W.

Control apparatus 31 generates the control signal corresponding to the respective operation tools, based on each operation amount of swivel operation tool 18, luffing operation tool 19, main drum operation tool 21m, and sub drum operation tool 21s.

Crane 1 configured in this way can move crane apparatus 6 to any desired position by causing vehicle 2 to travel. In addition, crane 1 operates luffing operation tool 19 to raise boom 9 at any desired luffing angle by using luffing hydraulic cylinder 12, and causes extending and retracting operation tool 20 to operate boom 9 so that boom 9 extends to have any desired length. In this manner, crane 1 can broaden a lifting or working radius of crane apparatus 6. In addition, crane 1 can hoist load W by using sub drum operation tool 21s, and can transport load W by causing swivel base 7 to swivel so as to operate swivel operation tool 18.

Next, remote operation terminal 32 will be described with reference to FIGS. 3 to 5.

As remote operation terminal 32 according to the present embodiment, an example will be described which adopts a radio control transmitter type. However, the present invention is also applicable to a wired operation terminal in addition to a portable terminal such as a smart phone or a wireless operation terminal such as a tablet terminal. Furthermore, as remote operation terminal 32 according to the present embodiment, without being limited to the portable type, a stationary type may be adopted. For example, remote operation terminal 32 may be installed in another room separated from a room having the work vehicle, for example, such as an operation room.

Figure 3:
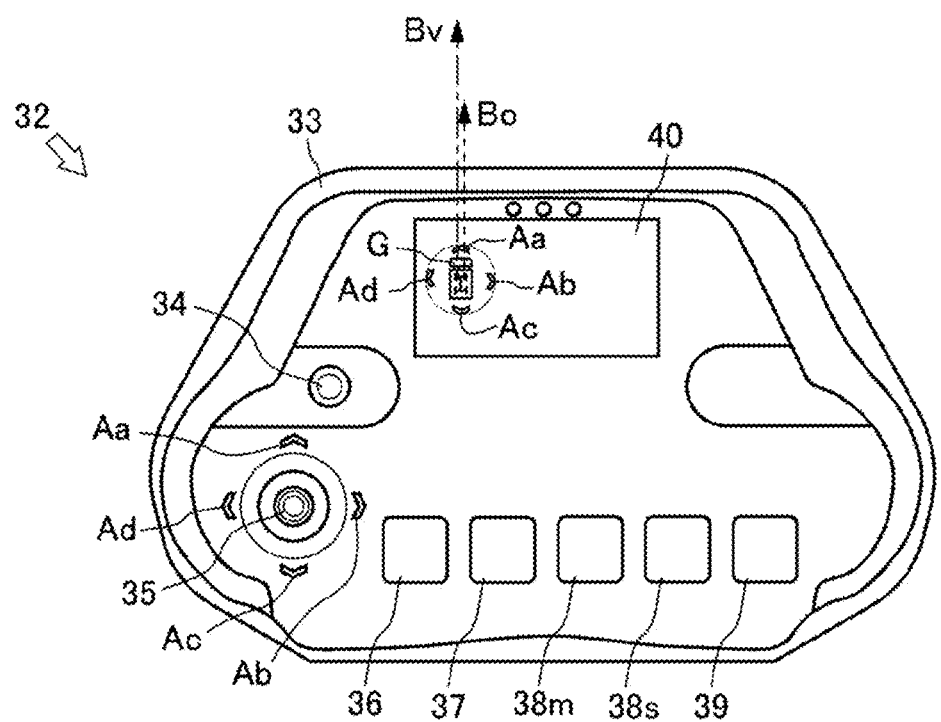
FIG. 3 is a plan view illustrating a schematic configuration of a remote operation terminal.

As illustrated in FIG. 3, remote operation terminal 32 is used when crane 1 is remotely operated. Remote operation terminal 32 includes housing 33, suspended load movement operation tool 35 serving as a first operation section, reference change operation tool 34 serving as a second operation section, terminal-side swivel operation tool 36, terminal-side extending and retracting operation tool 37, terminal-side main drum operation tool 38m, terminal-side sub drum operation tool 38s, terminal-side luffing operation tool 39, terminal-side display apparatus 40, terminal-side communication apparatus 41, and terminal-side control apparatus 42 (see FIGS. 2 and 4). The remote operation terminal 32 sets an operation direction reference Bo by using reference change operation tool 34, and transmits the control signal to crane apparatus 6 in order to operate each operation valve of the actuators moving load W by operating suspended load movement operation tool 35 or various operation tools.

Operation direction reference Bo of remote operation terminal 32 is a reference for setting a movement direction of load W with respect to vehicle 2, which is moved by a tilting operation of suspended load movement operation tool 35 in any desired direction. Specifically, operation direction reference Bo is a reference for setting correction angle θ1 for correcting the movement direction of load W (operation direction of crane apparatus 6) which is moved by the tilting operation of suspended load movement operation tool 35 in any desired direction, with respect to vehicle direction reference Bv serving as the reference for vehicle 2. According to the present embodiment, vehicle direction reference Bv is set to a forward direction which is a forward movement direction of vehicle 2 (see a one-dotted chain line arrow), and operation direction reference Bo of remote operation terminal 32 is set to an operation direction upward to the operation surface of housing 33 (see a broken line arrow).

Housing 33 is a main configuration member of remote operation terminal 32. Housing 33 is configured to have such a size that can be held by the operator with his or her hand. The operation surface of housing 33 has suspended load movement operation tool 35, reference change operation tool 34, terminal-side swivel operation tool 36, terminal-side extending and retracting operation tool 37, terminal-side main drum operation tool 38m, terminal-side sub drum operation tool 38s, terminal-side luffing operation tool 39, terminal-side display apparatus 40, and terminal-side communication apparatus 41 (see FIGS. 2 and 4).

Reference change operation tool 34 serving as the second operation section receives an instruction input for changing operation direction reference Bo of remote operation terminal 32 in suspended load movement operation tool 35. Reference change operation tool 34 is configured to include a rotation knob protruding from the operation surface of housing 33 and a sensor (not illustrated) for detecting the movement of the rotation knob. Reference change operation tool 34 is configured so that the rotation knob can be rotationally operated in any desired direction. Reference change operation tool 34 is configured to transmit the following signal to terminal-side control apparatus 42. The signal relates to correction angle θ1 (see FIG. 5A) which is an angle formed vehicle direction reference Bv representing a rotation direction and a rotation amount indicating a rotation position of the rotation knob detected by the sensor to operation direction reference Bo.

Suspended load movement operation tool 35 serving as the first operation section receives an instruction input for moving load W at any desired speed in any desired direction in any desired horizontal plane. Suspended load movement operation tool 35 is configured to include a sensor (not illustrated) for detecting the operation tool raised substantially vertically from the operation surface of housing 33 and the movement of the operation tool. Suspended load movement operation tool 35 is configured so that the operation tool can perform the tilting operation in any desired direction. Suspended load movement operation tool 35 is configured to transmit the following signal to terminal-side control apparatus 42. The signal relates to tilting angle θ2 (see FIG. 5B) formed from a tilting direction of the operation tool detected by the sensor to operation direction reference Bo, and a tilting amount thereof. As an indicator of tilting angle θ2 of suspended load movement operation tool 35, suspended load movement operation tool 35 displays arrow Aa indicating the upward direction toward the operation surface of housing 33, arrow Ab indicating the rightward direction toward the operation surface, arrow Ac indicating the downward direction toward the operation surface, and arrow Ad indicating the leftward direction toward the operation surface.

Terminal-side swivel operation tool 36 receives an instruction input for causing crane apparatus 6 to swivel in any desired movement direction at any desired movement speed. Terminal-side swivel operation tool 36 is configured to include a sensor (not illustrated) for detecting the operation tool raised substantially vertically from the operation surface of housing 33 and the movement of the operation tool. Terminal-side swivel operation tool 36 is configured to be tiltable in both the leftward swivel instructed direction and the rightward swivel instructed direction. Terminal-side swivel operation tool 36 is configured to transmit the tilting direction and the tilting amount of the operation tool detected by the sensor to terminal-side control apparatus 42.

Terminal-side extending and retracting operation tool 37 receives an instruction input for causing boom 9 to extend and retract at any desired speed. Terminal-side extending and retracting operation tool 37 is configured to include a sensor (not illustrated) for detecting the operation tool raised from the operation surface of housing 33 and the movement of the operation tool. Terminal-side extending and retracting operation tool 37 is configured to be tiltable in both the extending instructed direction and the contracting instructed direction. Terminal-side extending and retracting operation tool 37 is configured to transmit the tilting direction and the tilting amount of the operation tool detected by the sensor to terminal-side control apparatus 42.

Terminal-side main drum operation tool 38m receives an instruction input for rotating main winch 13 in any desired direction at any desired speed. Terminal-side main drum operation tool 38m is configured to include a sensor (not illustrated) for detecting the operation tool raised from the operation surface of housing 33 and the movement of the operation tool. Terminal-side main drum operation tool 38m is configured to be tiltable in both the winding instructed direction and the unwinding instructed direction of main wire rope 14. Terminal-side main drum operation tool 38m is configured to transmit the tilting direction and the tilting amount of the operation tool detected by the sensor to terminal-side control apparatus 42. Terminal-side sub drum operation tool 38s is configured in the same manner.

Terminal-side luffing operation tool 39 receives an instruction input for causing boom 9 to perform luffing at any desired speed. Terminal-side luffing operation tool 39 is configured to include a sensor (not illustrated) for detecting the operation tool raised from the operation surface of housing 33 and the movement of the operation tool.

Terminal-side luffing operation tool 39 is configured to be tiltable in both the raising instructed direction and the lowering instructed direction. Terminal-side luffing operation tool 39 is configured to transmit the tilting direction and the tilting amount of the operation tool detected by the sensor to terminal-side control apparatus 42.

Terminal-side display apparatus 40 displays various items of information such as posture information of crane 1 and information of the suspended load. Terminal-side display apparatus 40 is configured to include an image display apparatus such as a liquid crystal display. Terminal-side display apparatus 40 is disposed on the operation surface of housing 33. Terminal-side display apparatus 40 displays reference pattern G schematically representing vehicle 2 of crane 1, as an image representing an orientation of operation direction reference Bo of remote operation terminal 32. Reference pattern G is drawn so that vehicle direction reference Bv in vehicle 2 can be recognized. Reference pattern G is rotationally displayed in conjunction with the rotation position of reference change operation tool 34. That is, terminal-side display apparatus 40 displays a relative positional relationship between operation direction reference Bo in which the rotation direction and the rotation amount of reference change operation tool 34 are reflected and vehicle direction reference Bv.

Furthermore, as surrounding reference pattern G and as an indicator of tilting angle θ2 of suspended load movement operation tool 35, terminal-side display apparatus 40 displays arrow Aa indicating the upward direction toward the operation surface of housing 33, arrow Ab indicating the rightward direction toward the operation surface, arrow Ac indicating the downward direction toward the operation surface, and arrow Ad indicating the leftward direction toward the operation surface.

Figure 4:
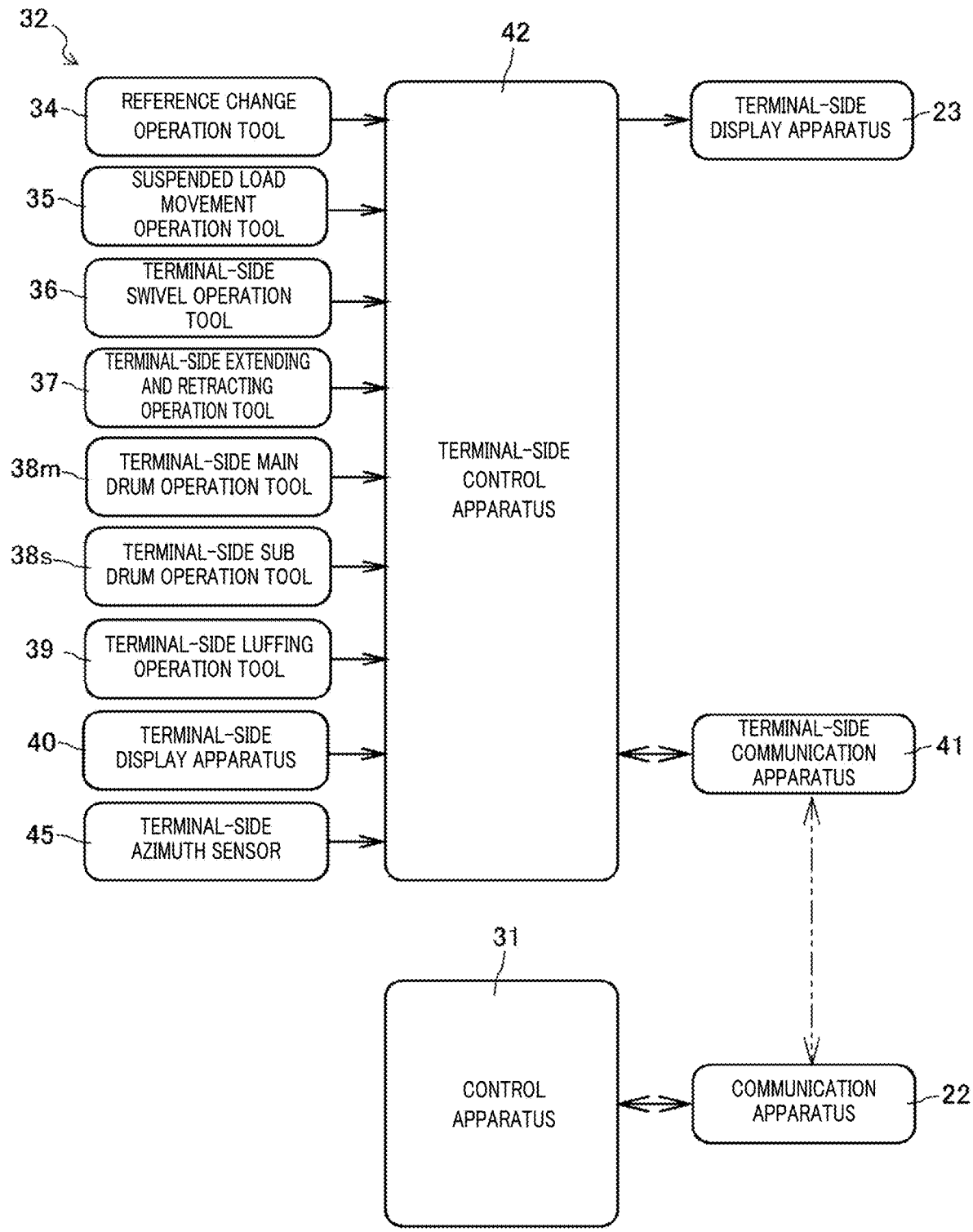
FIG. 4 is a block diagram illustrating a control configuration of the remote operation terminal.

As illustrated in FIG. 4, terminal-side communication apparatus 41 receives the control information of crane apparatus 6, and transmits the control information received from remote operation terminal 32. Terminal-side communication apparatus 41 is disposed inside housing 33. When terminal-side communication apparatus 41 receives an image from crane apparatus 6 or the control signal, terminal-side communication apparatus 41 is configured to transmit the image or the control signal to terminal-side control apparatus 42. In addition, terminal-side communication apparatus 41 is configured to transmit the control information received from terminal-side control apparatus 42 to crane apparatus 6 of crane 1.

Terminal-side control apparatus 42 serving as the control section controls remote operation terminal 32. Terminal-side control apparatus 42 is disposed inside housing 33 of remote operation terminal 32. Terminal-side control apparatus 42 may be configured so that a CPU, a ROM, a RAM, and an HDD are substantially connected to each other by using a bus, or may be configured to include one chip of an LSI. Terminal-side control apparatus 42 stores various programs or data for controlling each operation of suspended load movement operation tool 35, reference change operation tool 34, terminal-side swivel operation tool 36, terminal-side extending and retracting operation tool 37, terminal-side main drum operation tool 38m, terminal-side sub drum operation tool 38s, terminal-side luffing operation tool 39, terminal-side display apparatus 40, and terminal-side communication apparatus 41.

Terminal-side control apparatus 42 is connected to suspended load movement operation tool 35, terminal-side swivel operation tool 36, terminal-side extending and retracting operation tool 37, terminal-side main drum operation tool 38m, terminal-side sub drum operation tool 38s, and terminal-side luffing operation tool 39, and can acquire the operation signal including the tilting direction and the tilting amount of the operation tool of the respective operation tools. In addition, terminal-side control apparatus 42 is connected to reference change operation tool 34, and can acquire the operation signal including the rotation direction and the rotation angle at the rotation position of reference change operation tool 34.

Based on the operation signals of the respective operation tools which are acquired from terminal-side swivel operation tool 36, terminal-side extending and retracting operation tool 37, terminal-side main drum operation tool 38m, terminal-side sub drum operation tool 38s, and terminal-side luffing operation tool 39, terminal-side control apparatus 42 can generate the corresponding control signal of swivel valve 23, extending and retracting valve 24, luffing valve 25, main valve 26m, and sub valve 26s.

Figure 5A:
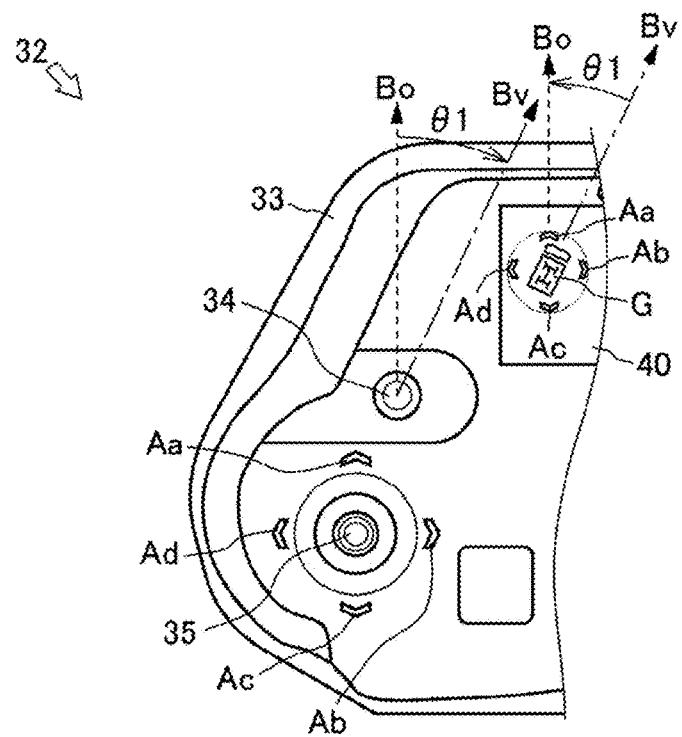
FIG. 5A is a partially enlarged view illustrating an operation direction reference in a case where a reference change operation tool of the remote operation terminal is operated according to Embodiment 1.

As illustrated in FIG. 5A, based on the operation signal for correction angle θ1 which is the angle corrected from the rotation direction and vehicle direction reference Bv at the rotation position acquired from reference change operation tool 34, terminal-side control apparatus 42 relatively rotates operation direction reference Bo with respect to vehicle direction reference Bv. In a case where reference change operation tool 34 is rotationally operated in one direction (rightward direction in FIG. 5A) from operation direction reference Bo to the position of correction angle θ1, terminal-side control apparatus 42 rotates operation direction reference Bo in the other direction (leftward direction in FIG. 5A) serving as the correction direction by using correction angle θ1 from vehicle direction reference Bv, and corrects the direction of operation direction reference Bo.

Figure 5B:
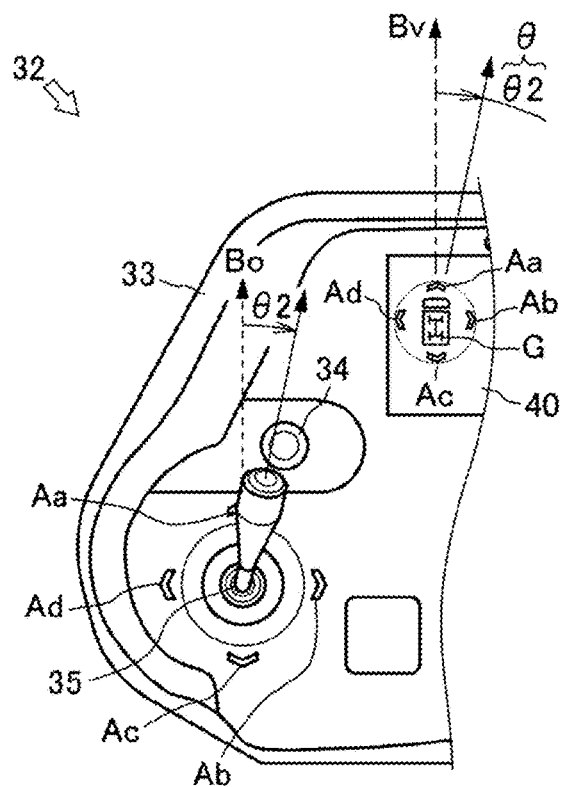
FIG. 5B is also a partially enlarged view illustrating a transporting direction of a suspended load in a case where a suspended load movement operation tool is operated.

As illustrated in FIG. 5B, based on the operation signal for tilting angle θ2 serving as the angle formed from operation direction reference Bo acquired from suspended load movement operation tool 35 to the tilting direction of the operation tool, and the tilting direction and the tilting amount, terminal-side control apparatus 42 calculates the movement direction and the movement speed of load W from operation direction reference Bo. In a state where the direction of operation direction reference Bo coincides with the direction of vehicle direction reference Bv, in a case where suspended load movement operation tool 35 performs the tilting operation as much as tilting angle θ2 to one right and left side of operation direction reference Bo, based on correction angle θ1 (correction angle θ1 is 0° in FIG. 5B) set by reference change operation tool 34, the correction direction (the correction direction is not set since correction angle θ1 is 0° in FIG. 5B), and tilting angle θ2, terminal-side control apparatus 42 calculates movement angle θ of load W with respect to vehicle direction reference Bv. Terminal-side control apparatus 42 calculates the control signal for moving load W at the movement speed corresponding to the tilting amount in the direction of movement angle θ.

As illustrated in FIG. 4, terminal-side control apparatus 42 is connected to terminal-side display apparatus 40, and can cause terminal-side display apparatus 40 to display images or various items of information received from crane apparatus 6. In addition, terminal-side control apparatus 42 can rotatably display reference pattern G (or a reference coordinate axis) in conjunction with the rotation direction and correction angle θ1 acquired from the rotation position of the rotation knob of reference change operation tool 34. Terminal-side control apparatus 42 is connected to terminal-side communication apparatus 41, and can transmit and receive various items of information to and from communication apparatus 22 of crane apparatus 6 via terminal-side communication apparatus 41.

Next, setting of operation direction reference Bo in remote operation terminal 32 and control of crane apparatus 6 by remote operation terminal 32 will be described with reference to FIGS. 6 to 8. As the directions of vehicle 2 of crane 1, the forward movement direction (direction of cabin 17 based on boom 9) of vehicle 2 is set to the forward direction, the rearward movement direction (opposite direction based on to the boom 9) is set to the rearward direction, the right side in the forward direction is set to the rightward direction, and the left side in the forward direction is set to the leftward direction. In the present embodiment, vehicle direction reference Bv (one-dotted chain line arrow in FIGS. 5 to 8) is set to the forward direction of vehicle 2, and operation direction reference Bo (broken line arrow in FIGS. 5 to 8) of remote operation terminal 32 is set to the operation direction (direction of arrow Aa displayed on suspended load movement operation tool 35 and terminal-side display apparatus 40) in the upward direction toward the operation surface of housing 33. In addition, in correction angle θ1 and tilting angle θ2, the leftward direction from the direction of arrow Aa is set to a positive direction, and the rightward from the direction of arrow Aa is set to a negative direction. In this manner, each reference numeral is used for an increment/decrement of the angle.

Figure 6:
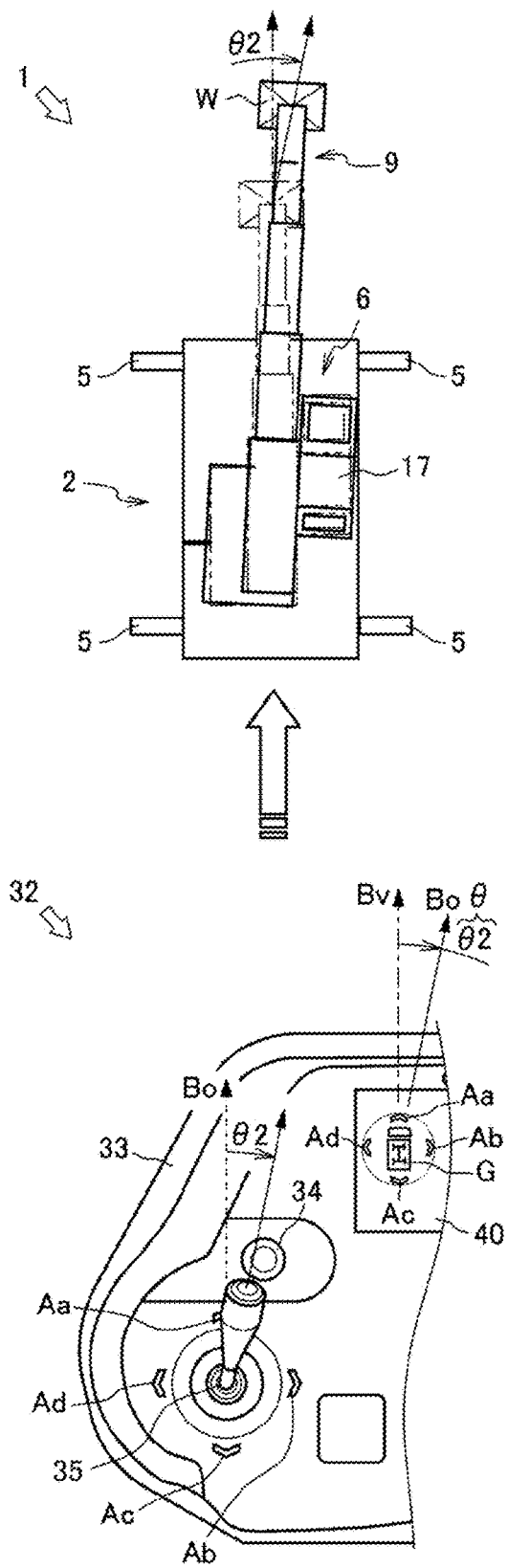
FIG. 6 is a schematic view illustrating the remote operation terminal by which the suspended load movement operation tool is operated, and an operation state of the crane operated by the remote operation terminal according to Embodiment 1.

As illustrated in FIG. 6, in a state where reference change operation tool 34 allows the direction of operation direction reference Bo to coincide with the direction of vehicle direction reference Bv, based on the rotation position of reference change operation tool 34, the remote operation terminal 32 calculates that correction angle θ1 serving as the angle from vehicle direction reference Bv to operation direction reference Bo is 0°. That is, since vehicle direction reference Bv and operation direction reference Bo coincide with each other, remote operation terminal 32 does not correct operation direction reference Bo by using correction angle θ1. In this case, in terminal-side display apparatus 40 of remote operation terminal 32, the forward direction of reference pattern G schematically representing vehicle 2 of crane 1 is displayed toward arrow Aa representing the tilting direction of suspended load movement operation tool 35.

Furthermore, as the tilting operation in any desired direction of suspended load movement operation tool 35, for example, in a case where the tilting operation is performed as much as any desired tilting amount at tilting angle θ2 from arrow Aa to arrow Ab side (right side of the arrow Aa) in the direction of operation direction reference Bo, remote operation terminal 32 calculates the control signal for moving the load W at the movement speed corresponding to the movement direction and the tilting amount of movement angle θ of load W from vehicle direction reference Bv=–tilting angle θ2 (minus symbol indicating the rightward direction from arrow Aa is included). Then, based on calculated movement angle θ and tilting amount, remote operation terminal 32 generates the corresponding control signal of swivel valve 23, extending and retracting valve 24, luffing valve 25, main valve 26m, and sub valve 26s, and transmits the control signal to crane 1 by using terminal-side communication apparatus 41.

When crane 1 receives the control signal of the movement speed corresponding to movement angle θ and the tilting amount of load W from remote operation terminal 32, crane 1 moves load W at the speed corresponding to the tilting amount in the direction of movement angle θ of load W from vehicle direction reference Bv. In crane 1, suspended load movement operation tool 35 is tilted as much as a predetermined tilting amount at tilting angle θ2 in the rightward direction (negative direction) from arrow Aa. Accordingly, load W is moved in the direction of movement angle θ=tilting angle θ2, clockwise in the forward direction of vehicle 2 at the transportation speed corresponding to the tilting amount of suspended load movement operation tool 35. In this case, crane 1 controls swivel hydraulic motor 8, extending and retracting hydraulic cylinder, luffing hydraulic cylinder 12, and main hydraulic motor in accordance with a movement locus of load W.

Figure 7:
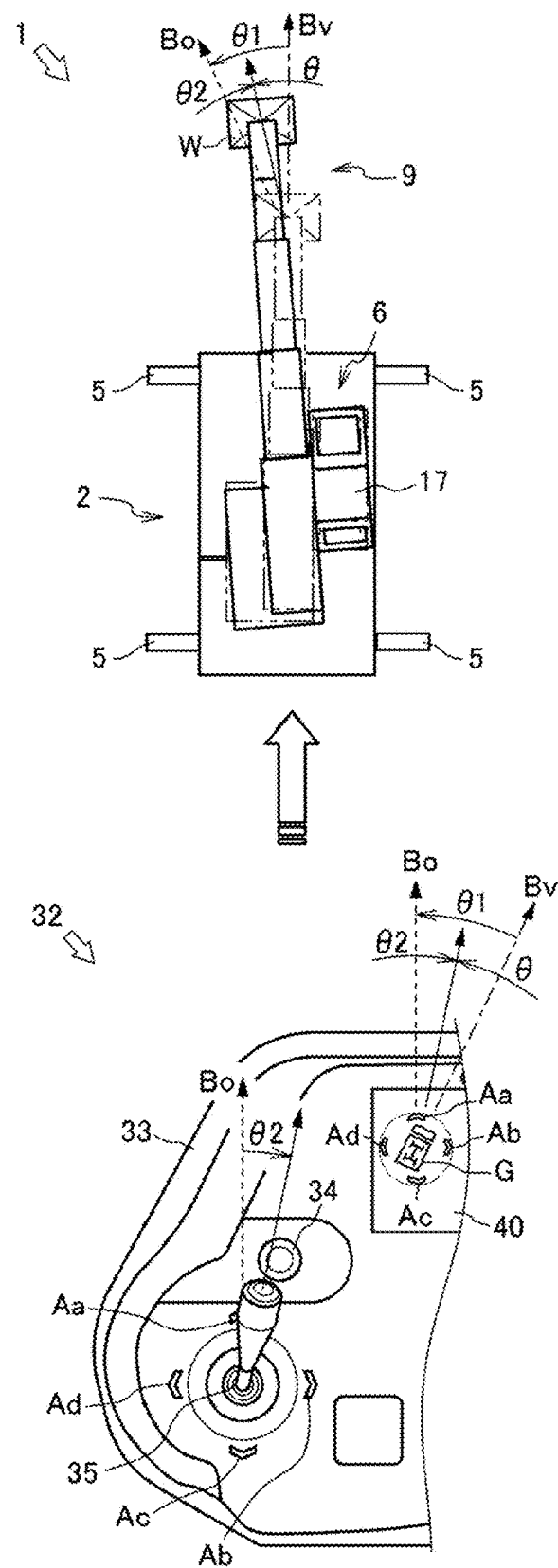
FIG. 7 is a schematic view illustrating the remote operation terminal by which the suspended load movement operation tool is operated in one direction after the reference change operation tool is operated, and an operation state of the crane operated by the remote operation terminal according to Embodiment 1.

As illustrated in FIG. 7, as the rotation position where vehicle direction reference Bv and operation direction reference Bo do not coincide with each other, for example, in a case where reference change operation tool 34 is rotationally operated as much as correction angle θ1 in the rightward direction from vehicle direction reference Bv (see FIG. 5A), remote operation terminal 32 corrects operation direction reference Bo to a position rotated as much as correction angle θ1 in the leftward direction which is the correction direction from vehicle direction reference Bv. That is, in remote operation terminal 32, operation direction reference Bo is set to a position rotated as much as correction angle θ1 in the leftward direction from vehicle direction reference Bv. In this case, in terminal-side display apparatus 40 of remote operation terminal 32, the forward direction of reference pattern G which schematically represents vehicle 2 of crane 1 is displayed in the direction of correction angle θ1 toward the rightward direction from arrow Aa serving as operation direction reference Bo.

As the tilting operation in any desired direction of suspended load movement operation tool 35, for example, in a case where the tilting operation is performed as much as any desired tilting amount at tilting angle θ2 in the rightward direction from arrow Aa serving as operation direction reference Bo, based on tilting angle θ2 in the rightward direction (negative direction) from operation direction reference Bo and correction angle θ1 in the leftward direction (positive direction) serving as the correction angle from vehicle direction reference Bv of operation direction reference Bo, remote operation terminal 32 calculates the control signal for moving load W at the movement speed corresponding to the movement direction and the tilting amount of movement angle θ of load W from vehicle direction reference BV=correction angle θ1−tilting angle θ2. Then, based on calculated movement angle θ and tilting amount, remote operation terminal 32 generates the corresponding control signal of swivel valve 23, extending and retracting valve 24, luffing valve 25, main valve 26*m*, and sub valve 26*s*, and transmits the control signal to crane 1 by using terminal-side communication apparatus 41.

When crane 1 receives the control signal of the movement speed corresponding to movement angle θ and the tilting amount of load W from remote operation terminal 32, crane 1 moves load W at the speed corresponding to the tilting amount in the direction of movement angle θ of load W from forward direction of the vehicle 2 which serves as vehicle direction reference Bv. In crane 1, suspended load movement operation tool 35 is tilted as much as a predetermined tilting amount at tilting angle θ2 in the rightward direction (negative direction) from arrow Aa. Accordingly, load W is moved in the direction of movement angle θ of load W from vehicle direction reference Bv=correction angle θ1−tilting angle θ2 at the transportation speed corresponding to the tilting amount of suspended load movement operation tool 35. In this case, crane 1 controls swivel hydraulic motor 8, extending and retracting hydraulic cylinder, luffing hydraulic cylinder 12, and main hydraulic motor in accordance with the movement locus of load W.

In a case of movement angle θ=correction angle θ1−tilting angle θ2=0°, that is, in a case where correction angle θ1 is equal to tilting angle θ2 of suspended load movement operation tool 35, crane 1 moves load W in the forward direction of vehicle 2 which serves as vehicle direction reference Bv.

In a case of movement angle θ=correction angle θ1−tilting angle θ2>0°, that is, in a case where correction angle θ1 is larger than tilting angle θ2 of suspended load movement operation tool 35, crane 1 moves load W in the direction of movement angle θ in the leftward direction (positive direction) of the forward direction of vehicle 2 which serves as vehicle direction reference Bv.

In a case of movement angle θ=correction angle θ1−tilting angle θ2<0°, that is, in a case where correction angle θ1 is smaller than tilting angle θ2 of suspended load movement operation tool 35, crane 1 moves load W in the direction of movement angle θ in the rightward direction (negative direction) of the forward direction of vehicle 2 which serves as vehicle direction reference Bv.

Figure 8:
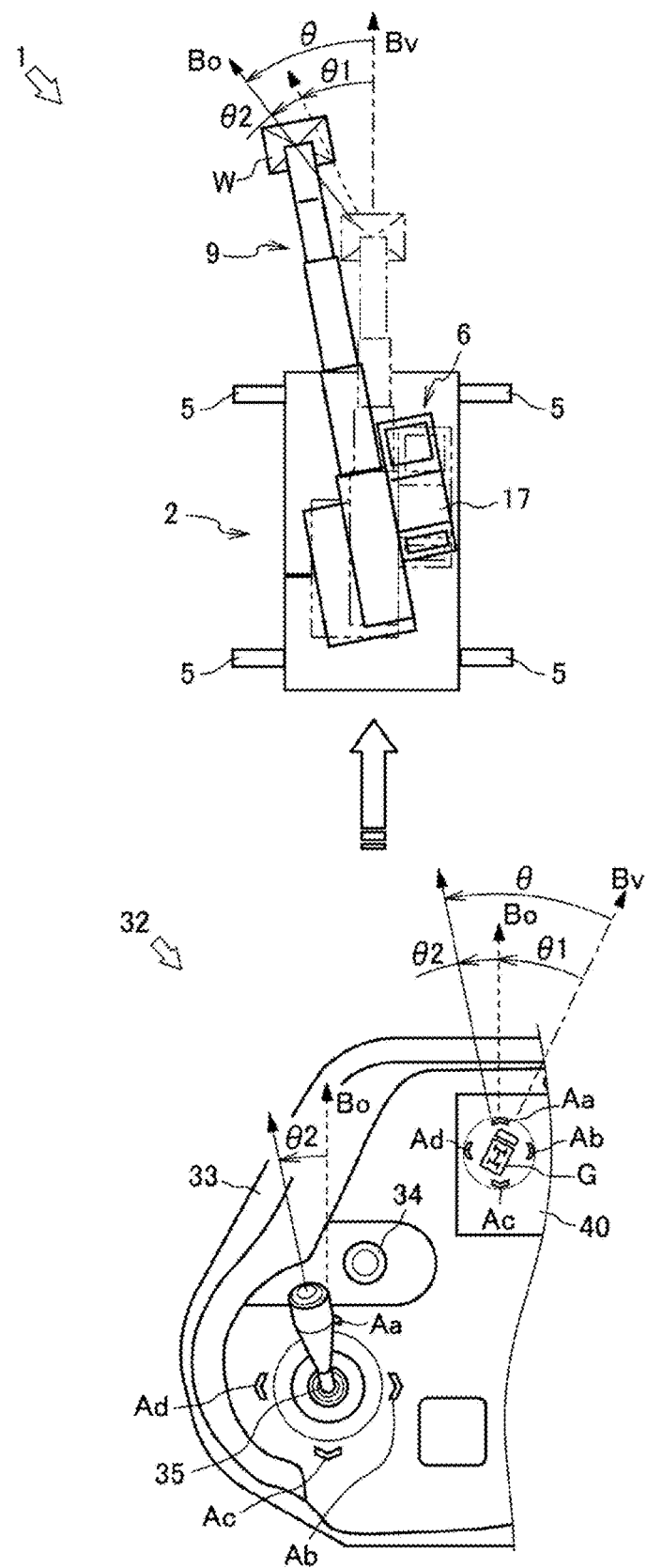
FIG. 8 is a schematic view illustrating the remote operation terminal by which the suspended load movement operation tool is operated in the other direction after the reference change operation tool is operated, and an operation state of the crane operated by the remote operation terminal according to Embodiment 1.

In addition, as illustrated in FIG. 8, as the tilting operation in any desired direction of suspended load movement operation tool 35, for example, in a case where the tilting operation is performed as much as any desired tilting amount in the direction of tilting angle θ2 from arrow Aa serving as operation direction reference Bo, terminal-side control apparatus 42 acquires an operation signal for tilting angle θ2 formed from operation direction reference Bo to the tilting direction toward the leftward direction (positive direction) of the operation tool and the tilting amount, from a sensor (not illustrated) of suspended load movement operation tool 35. Furthermore, based on the acquired operation signal and correction angle θ1 in the leftward direction (positive direction) which serves as the correction amount from vehicle direction reference Bv of operation direction reference Bo, terminal-side control apparatus 42 calculates the control signal for moving load W at the movement speed corresponding to the movement direction and the tilting amount of movement angle θ of load W from vehicle direction reference Bv=correction angle θ1+tilting angle θ2. Then, based on movement angle θ and the tilting amount which are calculated by terminal-side control apparatus 42, remote operation terminal 32 generates the corresponding control signal of swivel valve 23, extending and retracting valve 24, luffing valve 25, main valve 26*m*, and sub valve 26*s*, and transmits the control signal to crane 1 by using terminal-side communication apparatus 41.

When crane 1 receives the control signal of the movement speed corresponding to movement angle θ and the tilting amount of load W from remote operation terminal 32, crane 1 moves load W at the speed corresponding to the tilting amount in the direction of movement angle θ of load W from the forward direction of vehicle 2 which serves as vehicle direction reference Bv. In crane 1, suspended load movement operation tool 35 is tilted as much as a predetermined tilting amount at tilting angle θ2 in the leftward direction (positive direction) from arrow Aa. Accordingly, crane 1 moves load W in the direction of movement angle θ of load W=correction angle θ1+tilting angle θ2 in the leftward direction (positive direction) of vehicle direction reference Bv at the transporting speed corresponding to the tilting amount of suspended load movement operation tool 35. In this case, crane 1 controls swivel hydraulic motor 8, extending and retracting hydraulic cylinder, luffing hydraulic cylinder 12, and main hydraulic motor in accordance with the movement locus of load W.

According to this configuration, in crane 1, the operator does not need to recognize the relative position of remote operation terminal 32 with respect to crane apparatus 6 from remote operation terminal 32. Crane 1 causes reference change operation tool 34 to set operation direction reference Bo of suspended load movement operation tool 35 to any desired value as the relative angle with respect to vehicle direction reference Bv of work vehicle 2. In this case, operation direction reference Bo with respect to vehicle direction reference Bv is displayed on terminal-side display apparatus 40 of the remote operation apparatus. Accordingly, the operator is likely to visually recognize the relationship between vehicle direction reference Bv and operation direction reference Bo. In this manner, the operator can easily and simply perform the remote operation on crane apparatus 6 in accordance with the work condition by using remote operation terminal 32.

Next, crane 43 which is Embodiment 2 of the crane according to the present invention will be described with reference to FIGS. 2, 4, 9, and 10. Crane 43 according to the following respective embodiments is applied to crane 1 illustrated in FIGS. 1 to 10 instead of crane 1. The names, drawing numbers, and reference numerals which are used in the above description will be used so as to indicate the same configuration elements. In the following embodiments, specific description of points which are the same as those in the above-described embodiment will be omitted, and different points will be mainly described.

As illustrated in FIGS. 2 and 4, vehicle-side azimuth sensor 44 is disposed in vehicle 2 of crane 43, and terminal-side azimuth sensor 45 is disposed in remote operation terminal 32. Vehicle-side azimuth sensor 44 and terminal-side azimuth sensor 45 are configured to include a three axis-type azimuth sensor. Vehicle-side azimuth sensor 44 and terminal-side azimuth sensor 45 detect geomagnetism so as to calculate an absolute azimuth. Vehicle-side azimuth sensor 44 is configured to calculate an azimuth based on the forward direction of vehicle 2. Terminal-side azimuth sensor 45 is configured to calculate an azimuth based on the upward direction toward the operation surface of housing 33 of remote operation terminal 32.

Control apparatus 31 is connected to vehicle-side azimuth sensor 44, and can acquire the azimuth in the forward direction of vehicle 2. In addition, terminal-side control apparatus 42 is connected to terminal-side azimuth sensor 45, and can acquire the azimuth in the upward direction toward the operation surface of housing 33 of remote operation terminal 32. In addition, terminal-side control apparatus 42 can acquire the azimuth in the forward direction of vehicle 2 via terminal-side communication apparatus 41.

As illustrated in FIG. 3, remote operation terminal 32 is used when crane 43 is remotely operated. Remote operation terminal 32 includes housing 33, suspended load movement operation tool 35 serving as the first operation section, reference change operation tool 34 serving as the second operation section, terminal-side swivel operation tool 36, terminal-side extending and retracting operation tool 37, terminal-side main operation tool 38m, terminal-side sub drum operation tool 38s, terminal-side luffing operation tool 39, terminal-side display apparatus 40, terminal-side communication apparatus 41, and terminal-side control apparatus 42.

As illustrated in FIG. 9, terminal-side display apparatus 40 displays various items of information. Terminal-side display apparatus 40 displays an image representing the azimuth of remote operation terminal 32, based on to the upward direction toward the operation surface of housing 33. In addition, the image representing the azimuth is rotationally displayed in conjunction with the rotation position of reference change operation tool 34. That is, terminal-side display apparatus 40 displays the azimuth of operation direction reference Bo in a state where the correction is reflected using the rotation position of reference change operation tool 34.

Furthermore, terminal-side display apparatus 40 displays reference pattern G schematically representing vehicle 2 of crane 43, based on the azimuth of vehicle 2. That is, reference pattern G is displayed so that the azimuth in the forward direction of vehicle 2 and the azimuth displayed on terminal-side display apparatus 40 coincide with each other. That is, terminal-side control apparatus 42 causes terminal-side display apparatus 40 to display reference pattern G in conjunction with the azimuth in the forward direction of vehicle 2 which is acquired via terminal-side communication apparatus 41. Reference pattern G is rotationally displayed in conjunction with the rotation position of reference change operation tool 34. In this manner, terminal-side display apparatus 40 displays a relative positional relationship between operation direction reference Bo where the correction is reflected using the rotation position of reference change operation tool 34 and vehicle direction reference Bv displayed based on the corrected azimuth.

Figure 9A:
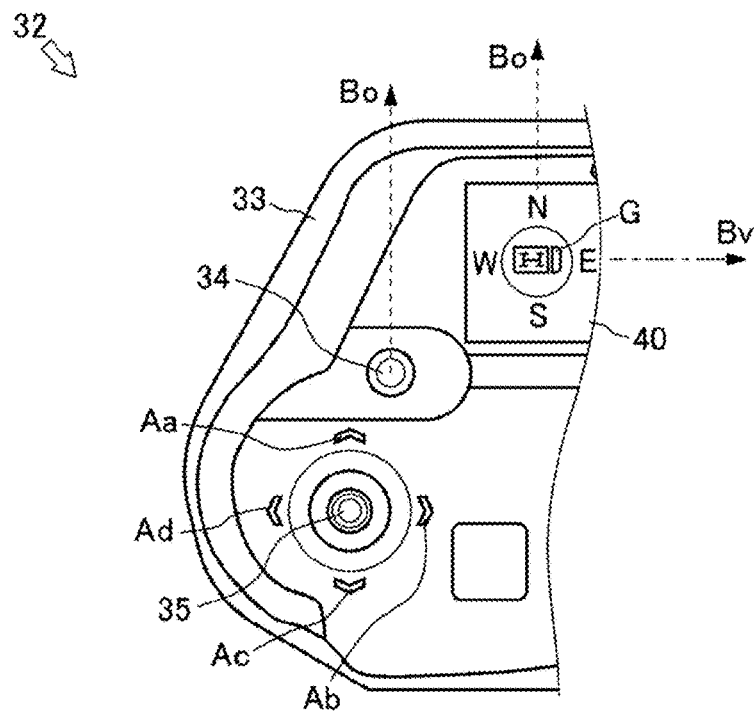
FIG. 9A is a partially enlarged view illustrating an operation direction reference for the remote operation terminal based on an arrangement state of the crane.

As illustrated in FIG. 9A, in a state where operation direction reference Bo in the upward direction facing the operation surface of housing 33 of remote operation terminal 32 faces the north while vehicle 2 faces the east, terminal-side display apparatus 40 displays "N" indicating the north, "E" indicating the east, "S" indicating the south, and "W" indicating the west around reference pattern G Reference pattern G is displayed in a state where the forward direction is directed to the direction of "E".

Figure 9B:
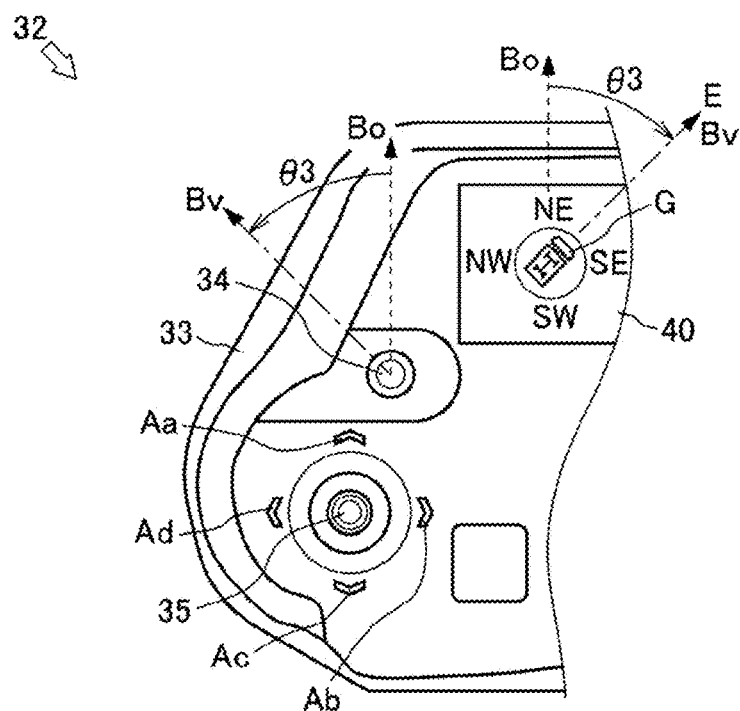
FIG. 9B is also a partially enlarged view illustrating the operation direction reference in a case where the reference change operation tool is operated according to Embodiment 2.

As illustrated in FIG. 9B, in a case where reference change operation tool 34 of remote operation terminal 32 is rotationally operated as much as 45° as correction angle θ3 toward the west, terminal-side control apparatus 42 corrects operation direction reference Bo from the north direction to the northeast direction which is the azimuth rotated as much as 45° toward the east side serving as the correction direction. That is, in remote operation terminal 32, operation direction reference Bo is set to the northeast direction rotated as much as the correction angle θ3 to the north side from vehicle direction reference Bv. In this case, terminal-side display apparatus 40 of remote operation terminal 32 displays "NE" indicating the northeast at a position upward to the operation surface of housing 33 serving as operation direction reference Bo, and displays "SE" indicating the southeast, "SW" indicating the southwest, and "NW" indicating the northwest at the respectively corresponding positions. In addition, the forward direction of reference pattern G is displayed on the east side of operation direction reference Bo so as to face the east (direction of "E" in FIG. 9B) which is the direction of correction angle θ3.

Figure 10:
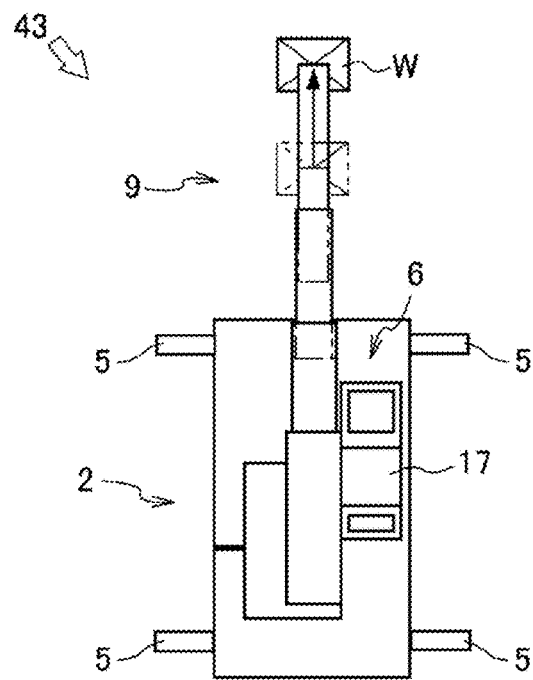
FIG. 10 is a schematic view illustrating a remote operation terminal by which a suspended load movement operation tool is operated in one direction after a reference change operation tool is operated, and an operation state of a crane operated by the remote operation terminal according to Embodiment 2.
Figure 10:
Figure 10:
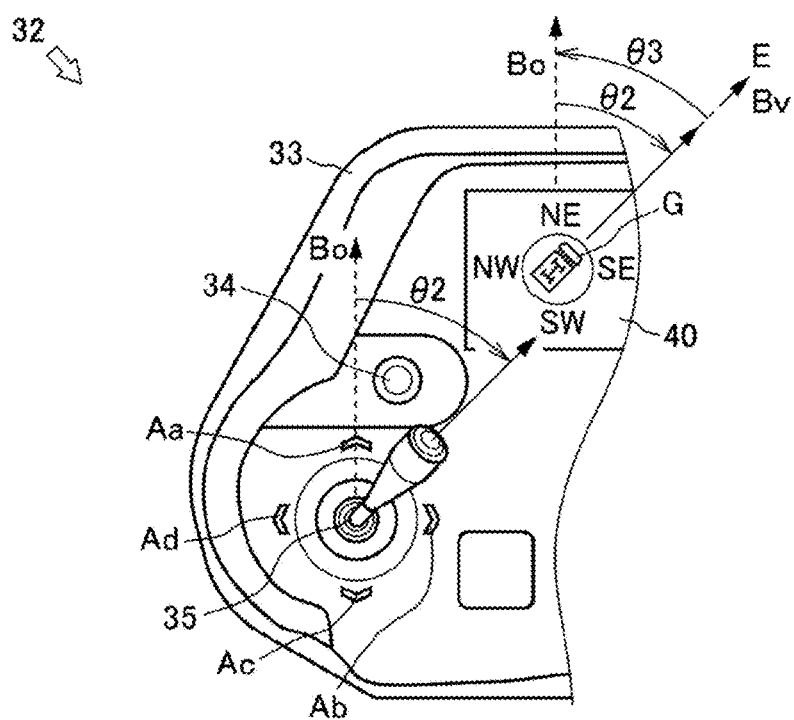

As illustrated in FIG. 10, as the tilting operation in any desired direction of suspended load movement operation tool 35, for example, in a case where the tilting operation is performed as much as any desired tilting amount in the direction of 45° as tilting angle θ2 to the east side from the northeast direction serving as operation direction reference Bo, remote operation terminal 32 calculates that the tilting operation is performed toward the east which is the azimuth of 45° toward the east from the northeast. Then, in remote operation terminal 32, the azimuth of the calculated tilting operation coincides with the east which is the azimuth of vehicle direction reference Bv. Accordingly, remote operation terminal 32 calculates movement angle θ of load W with respect to vehicle 2, as the forward direction of vehicle 2. Remote operation terminal 32 calculates the control signal for moving load W at the movement speed corresponding to movement angle θ and the tilting amount. Remote operation terminal 32 generates the control signal of swivel valve 23, extending and retracting valve 24, luffing valve 25, main valve 26m, and sub valve 26s, and transmits the control signal to crane 43 by using terminal-side communication apparatus 41.

When crane 43 receives the control signal of the movement speed corresponding to movement angle θ and the tilting amount of load W from remote operation terminal 32, crane 43 moves load W at the speed corresponding to the tilting amount in the forward direction of vehicle 2 which serves as vehicle direction reference Bv. In crane 43, suspended load movement operation tool 35 is tilted as much as a predetermined tilting amount in the direction of 45° to the east side from the northeast. Accordingly, load W is moved at the transportation speed corresponding to the tilting amount of suspended load movement operation tool 35 to the east which serves as the direction of vehicle direction reference Bv.

According to this configuration, in crane 43, operation direction reference Bo of suspended load movement operation tool 35 and vehicle direction reference Bv of vehicle 2 are set to any desired value, based on the azimuth or the terrain information. Therefore, it is possible to objectively recognize the movement direction of load W without recognizing the relative positional relationship of remote operation terminal 32 with respect to crane apparatus 6 from remote operation terminal 32. In this manner, the operator can easily and simply perform the remote operation on crane apparatus 6 in accordance with the work condition by using remote operation terminal 32. According to the present embodiment, the relative positional relationship between vehicle direction reference Bv and operation direction reference Bo is calculated, based on the azimuth indicated using geomagnetism. However, based on the position information from the GNSS satellite, and the terrain information or the feature information acquired by camera 9b instead of the azimuth, the relative positional relationship between vehicle direction reference Bv and operation direction reference Bo may be calculated.

In Embodiment 1 and Embodiment 2, in terminal-side control apparatus 42 of remote operation terminal 32, crane 1 calculates the control signal for moving load W, based on the rotation direction and the rotation amount of reference change operation tool 34 and the tilting operation of suspended load movement operation tool 35. However, a configuration may be adopted in which the control signal may be calculated in control apparatus 31 of crane 1. Crane 1 acquires the operation signal of reference change operation tool 34 and suspended load movement operation tool 35 from remote operation terminal 32. Crane 1 calculates the control signal for moving load W, based on the operation signal of reference change operation tool 34 and suspended load movement operation tool 35 in control apparatus 31. According to this configuration, crane 1 calculates the control signal by using control apparatus 31 which shows higher performance than terminal-side control apparatus 42. In this manner, it is possible to improve operability.

Next, third to fifth embodiments of remote operation terminal 32 according to the present invention will be described with reference to FIGS. 11 to 19.

(External Configuration)

A schematic configuration example of remote operation terminal 32 according to the present embodiment will be described with reference to FIG. 11. Remote operation terminal 32 according to the present embodiment has the operation surface. Suspended load movement operation tool 35 (illustrated as 35a, 35bup, and 35bdown in FIG. 11) serving as the first operation section, terminal-side display apparatus 40 serving as the display section, and reference change operation tool 34 serving as the second operation section are arranged on the operation surface. In addition, remote operation terminal 32 has terminal-side communication apparatus 41 serving as the communication section for communication connection with crane 1.

Suspended load movement operation tool 35 is an interface for performing the remote operation for a specific operation of crane 1. In FIG. 11, as a specific example of suspended load movement operation tool 35, a configuration will be described which includes operation stick 35a and an operation button. However, a configuration having another interface may be adopted. As another interface, it is conceivable to adopt a configuration using a touch panel. Specifically, terminal-side display apparatus 40 may be provided with a touch sensor. In this manner, it is conceivable that crane 1 is remotely operated via the operation using the touch sensor. In addition, one remote operation terminal 32 does not necessarily need two or more suspended load movement operation tools 35. For example, a configuration may be adopted which has only operation stick 35a serving as the operation section.

Figure 11:
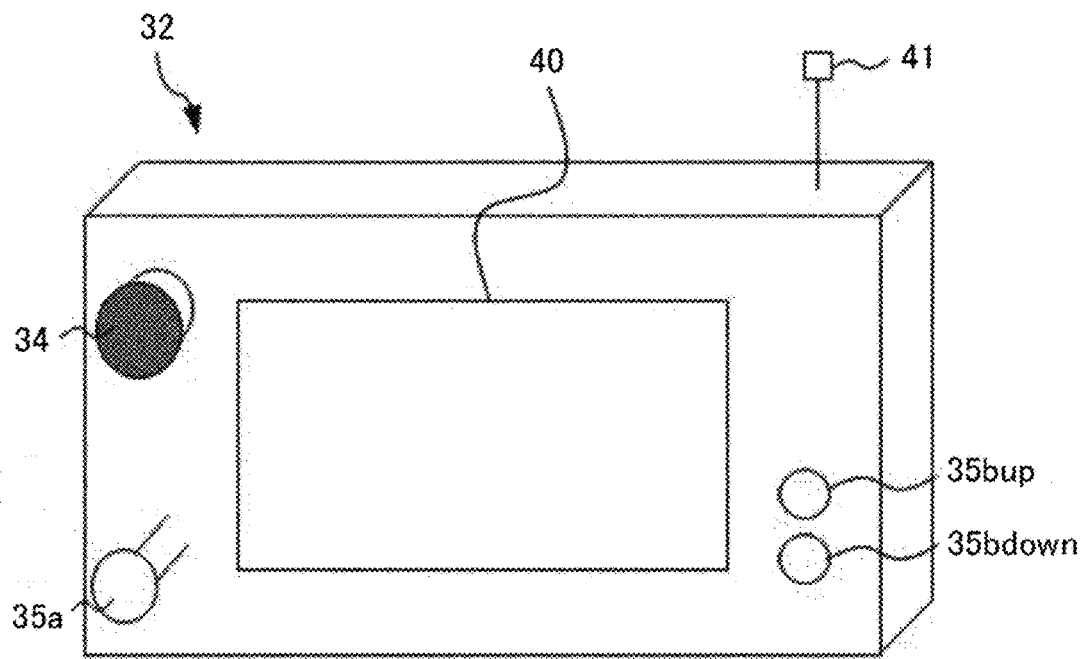
FIG. 11 illustrates an example of a front view of the remote operation terminal according to the present embodiment.

For example, operation stick 35a is located on the left side of the operation surface in the example illustrated in FIG. 11. The operator pulls down operation stick 35a in a predetermined direction. In this manner, the operator can horizontally drive main hook block 10 including the hook in the direction corresponding to the predetermined direction at the speed corresponding to the operation amount. That is, when operation stick 35a is greatly pulled down, main hook block 10 is driven fast. When operation stick 35a is slightly pulled down, main hook block 10 is driven slowly.

For example, the operation button is located on the right side of the operation surface in the example illustrated in FIG. 11. For example, the operation button includes raising button 35bup for raising the hook and lowering button 35bdown for lowering the hook. In the present embodiment, a configuration has been described where main hook block 10 is moved upward and downward by using the operation button. However, the present invention is not limited to this configuration. For example, lever A for moving main hook block 10 upward and downward may be provided, and lever B for moving the distal end of boom 14 upward and downward may be provided. In this manner, a configuration may be adopted in which button 42b and lever A and/or lever B are operated so as to move main hook block 10 upward and downward.

For example, terminal-side display apparatus 40 is located at the center portion of the operation surface, and an image generated based on the detection information of the detection apparatus is displayed on terminal-side display apparatus 40. For example, terminal-side display apparatus 40 is configured to include a liquid crystal display, an organic electro luminescence (EL) display, and an inorganic EL display. In addition, terminal-side display apparatus 40 may be configured to include a touch sensor (not illustrated).

Terminal-side display apparatus 40 need not be integrated with another interface, such as suspended load movement operation tool 35, and for example, may be a head-mounted type head-mounted display (HMD). The HMD has an optical unit corresponding to right and/or left eyes of a wearer, and is configured to be capable of controlling at least vision (may be configured to be capable of controlling hearing other than vision, for example). The wearer can visually recognize an operation image (video) presented through the HMD, and can intuitively perform the operation while viewing the operation image presented by the HMD without confirming the input operation surface. The operation image presented to the wearer may be a virtual reality image (video) generated based on the detection information of the detection apparatus. The HMD can also project different images to the right and left eyes of the wearer, and can present a 3D image when images with parallax are displayed on the right and left eyes.

In addition, remote operation terminal 32 according to the present embodiment has reference change operation tool 34 for rotationally operating the image displayed on terminal-side display apparatus 40. In the present embodiment, an example will be described in which an image rotation knob type is used as the operation interface of reference change operation tool 34. However, other interfaces may be used.

In the example illustrated in FIG. 11, reference change operation tool 34 is located above operation stick 35a, and is configured to be rotatable about the axis. When the operator rotates the image rotation knob, the image displayed on terminal-side display apparatus 40 is rotated in a predetermined rotation direction, as much as a predetermined rotation amount, and at a predetermined rotation speed in accordance with the rotation direction, the rotation amount, and the input speed.

In addition, it is preferable that remote operation terminal 32 has a display direction fixing section (not illustrated) that fixes the display direction of the image to be displayed on terminal-side display apparatus 40. A specific example includes the following example. For example, reference change operation tool 34 is operated to be pressed against the operation surface side. In this manner, reference change operation tool 34 is fitted into a fitting hole (not illustrated), thereby bringing reference change operation tool 34 into a locked state (state where the rotational operation cannot be performed). Alternatively, a method of fixing the display direction by using software control may be adopted.

Furthermore, terminal-side display apparatus 40 may be configured to include a touch sensor so as to rotate the image via the operation using the touch sensor. In this case, the method is not limited as long as information relating to the rotation of the image (for example, the rotation direction, the rotation amount, and the rotation speed) can be uniquely determined by the contents of the operation. Specifically, the following configuration may be adopted. The operator detects the rotation direction, the rotation amount, and the rotation speed by rotating one finger and the other finger on terminal-side display apparatus 40. In accordance with the detection information, the image displayed on terminal-side display apparatus 40 is rotated in a predetermined rotation direction, as much as a predetermined rotation amount, and at a predetermined rotation speed.

(Hardware Configuration)

Figure 12:
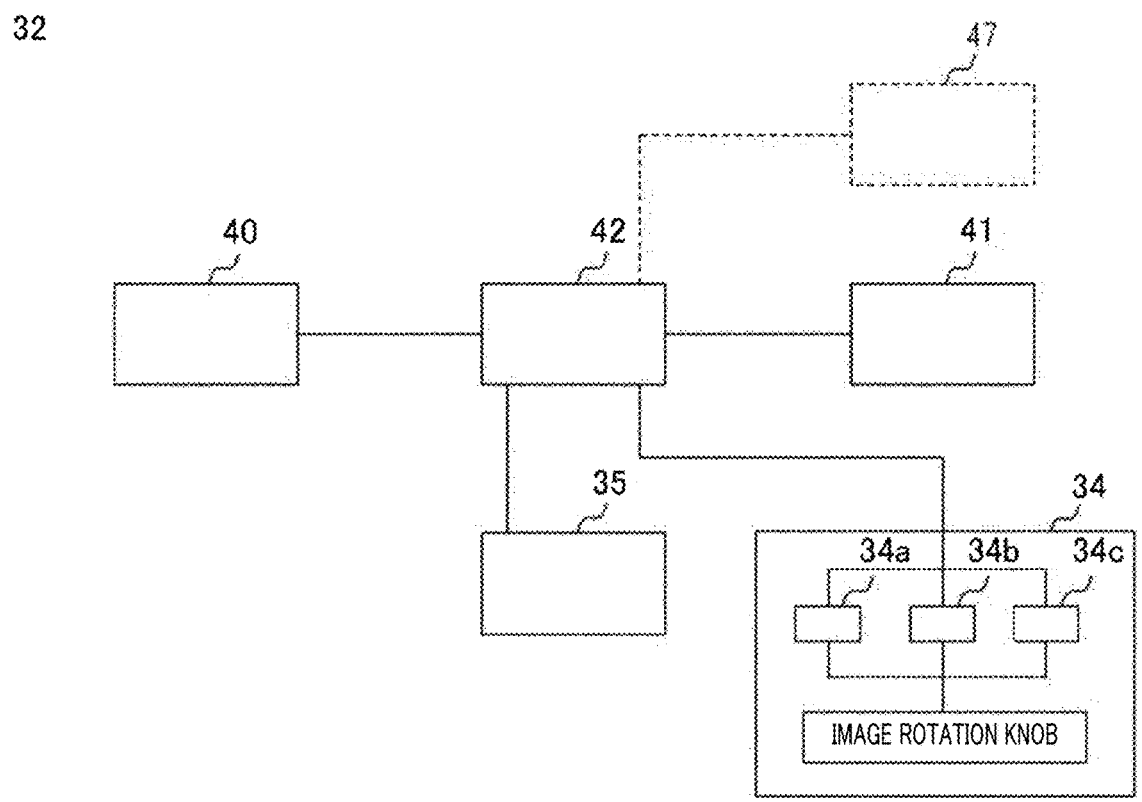
FIG. 12 illustrates an example of a hardware configuration diagram of the remote operation terminal according to the present embodiment.

Next, a hardware configuration of remote operation terminal 32 according to the present embodiment will be described with reference to FIG. 12. Terminal-side control apparatus 42 serving as the control section of remote operation terminal 32 comprehensively controls remote operation terminal 32 while performing various arithmetic processes. Specifically, terminal-side control apparatus 42 is configured to be capable of receiving the operation information from suspended load movement operation tool 35 or reference change operation tool 34. In addition, terminal-side control apparatus 42 is configured to be capable of transmitting and receiving the control information and/or the image to and from terminal-side communication apparatus 41. Furthermore, terminal-side control apparatus 42 is configured to be capable of transmitting and receiving the image to and from terminal-side display apparatus 40.

For example, the terminal-side control apparatus 42 is configured to include a central processing unit (CPU), a read only memory (ROM), and a random access Memory (RAM), as an arithmetic section (not illustrated). Respective configuration elements are connected to each other via a bus. The CPU performs various arithmetic processes by accessing the RAM, when necessary. The ROM is a non-volatile memory which stores firmware such as an operating system (OS), a program, and various parameters to be executed by the CPU. The RAM is used as a CPU work region, and temporarily holds the OS, applications under execution, and data under processing.

In addition, as an input/output interface, remote operation terminal 32 has terminal-side communication apparatus (communication section) 41, terminal-side display apparatus 40, suspended load movement operation tool 35, and reference change operation tool 34.

Terminal-side communication apparatus 41 is a module for communication connection with crane 1, and terminal-side display apparatus 40 is a display apparatus. Terminal-side communication apparatus 41 is configured to be capable of transmitting and receiving the control information and/or the image to and from communication apparatus 22 serving as the communication section of crane 1.

Suspended load movement operation tool 35 is an input apparatus such as the operation stick and operation button, and is an interface for performing the remote operation for the concrete operation of crane 1.

Terminal-side display apparatus 40 is an interface for displaying the image generated based on the detection information of the detection apparatus, and is configured to be capable of transmitting (receiving) the image to (from) terminal-side control apparatus 42.

As described with reference to FIG. 11, reference change operation tool 34 has the operation interface such as the image rotation knob for the operator to input the rotational operation.

In addition, reference change operation tool 34 includes operation (rotation) direction detection section 34*a*, operation (rotation) speed detection section 34*b*, and operation (rotation) amount detection section 34*c*, which respectively correspond to the operation direction (corresponding to the rotation direction), the operation speed (corresponding to the rotation speed), and the operation amount (corresponding to the rotation amount) of the operation interface. Each operation command signal detected by detection sections 34*a*. 34*b*, and 34*c* is transmitted to terminal-side control apparatus 42, and terminal-side control apparatus 42 rotates the image, based on the operation command signal. The rotated image is displayed (again) on terminal-side display apparatus 40.

In the above-described example, an example has been described in which the image is transmitted and the operation command signal is transmitted between terminal-side communication apparatus 41 on remote operation terminal 32 side and communication apparatus 22 on crane 1 side. However, the present invention is not limited to this configuration. As illustrated by a broken line in FIG. 12, communication section 47 for transmitting the image may be separately disposed on remote operation terminal 32 side, and image transmitting communication section (image antenna) 48 (see FIG. 13) may be disposed on the crane side. In this manner, a configuration may be adopted so that the image and the operation command signal are separately transmitted.

(Configuration of Control System)

(Control System of Crane 1)

Figure 13:
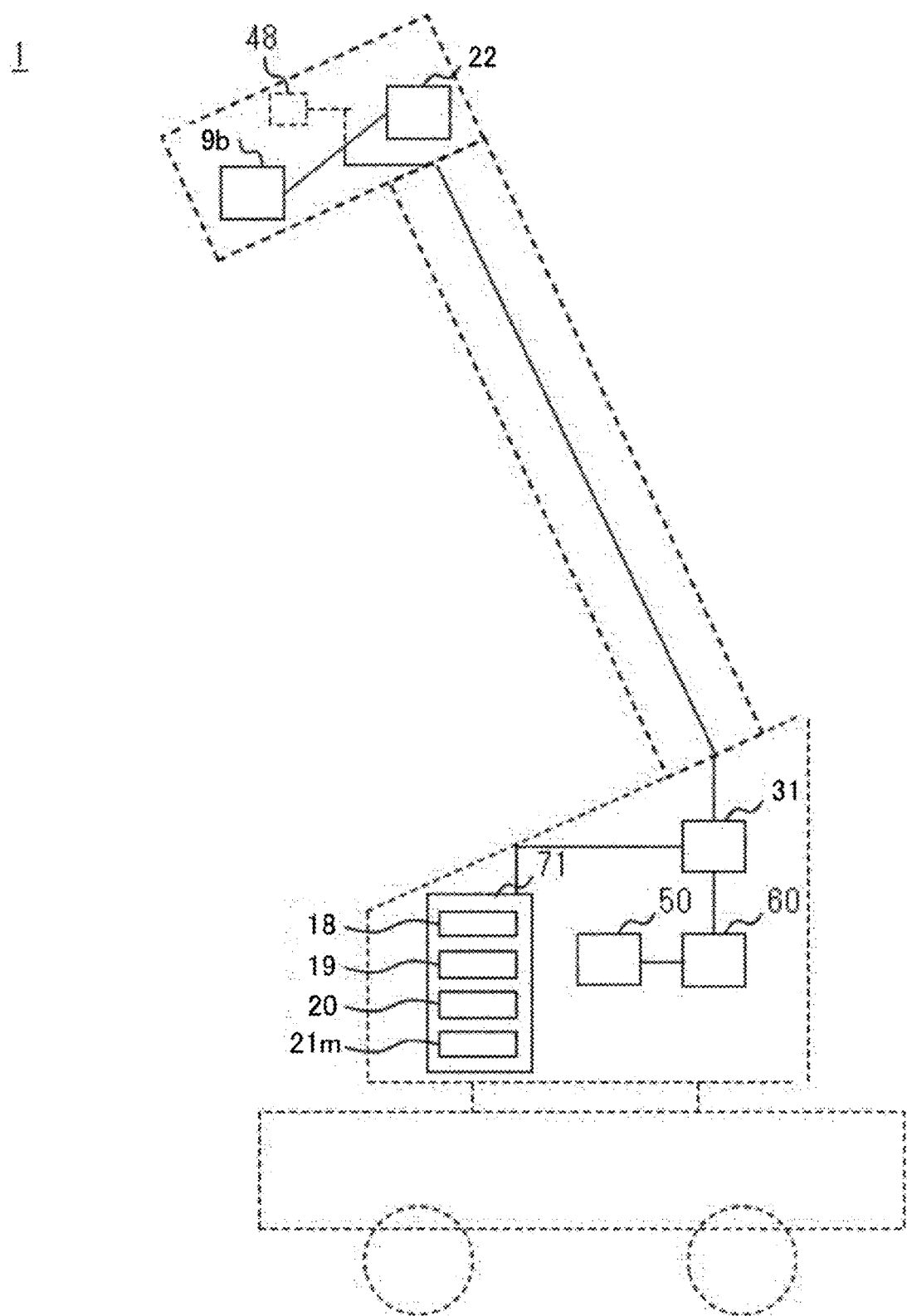
FIG. 13 illustrates an example of a hardware configuration diagram of the crane according to the present embodiment.

A control system of crane 1 according to the present embodiment will be described with reference to FIG. 13. A broken line in FIG. 13 schematically illustrates an external configuration of crane 1.

Crane 1 according to the present embodiment has at least actuator 50, control apparatus 31, communication apparatus 22, operation section 71, and camera 9*b* serving as the detection apparatus.

Actuator 50 corresponds to the "work apparatus" in the appended claims, and has one or a plurality of cylinders and motors. In addition, actuator 50 is configured to be capable of receiving the control information from control apparatus 31.

Control apparatus 31 has at least a bus, an arithmetic apparatus, and a storage apparatus. Control apparatus 31 is configured to be capable of transmitting and receiving the control information to and from communication apparatus 22, and is configured to be capable of receiving the detection information from camera 9*b*.

In addition, control apparatus 31 is configured to be capable of transmitting the control information to actuator 50. FIG. 13 illustrates a configuration in which control valve 60 can transmit the control information to actuator 50. In this case, control valve 60 and control apparatus 31 correspond to the "control apparatus" in the appended claims.

Communication apparatus 22 is configured to be capable of transmitting and receiving the control information and/or the image to and from remote operation terminal 32. In addition, communication apparatus 22 is configured to be capable of transmitting and receiving the control information and/or the image to and from control apparatus 31.

Camera 9b is configured to be capable of transmitting the detection information to communication apparatus 22. Camera 9b normally includes an image generation section (not illustrated) that generates an image, based on the detection information. However, a configuration may be adopted in which camera 9b and the image generation section are separately arranged.

In addition, crane 1 normally has operation section 71, and the operation of crane 1 can be controlled, based on the operation information of operation section 71. In this case, operation section 71 is configured to be capable of transmitting the control information to control apparatus 31, based on the operation. For example, operation section 71 includes swivel operation tool 18 serving as a swivel lever, luffing operation tool 19 serving as a luffing lever, extending and retracting operation tool 20 serving as a extending and retracting lever, and main drum operation tool 21m serving as a main winch lever.

(Image Rotation Operation of Remote Operation Terminal 32)

Figure 14:
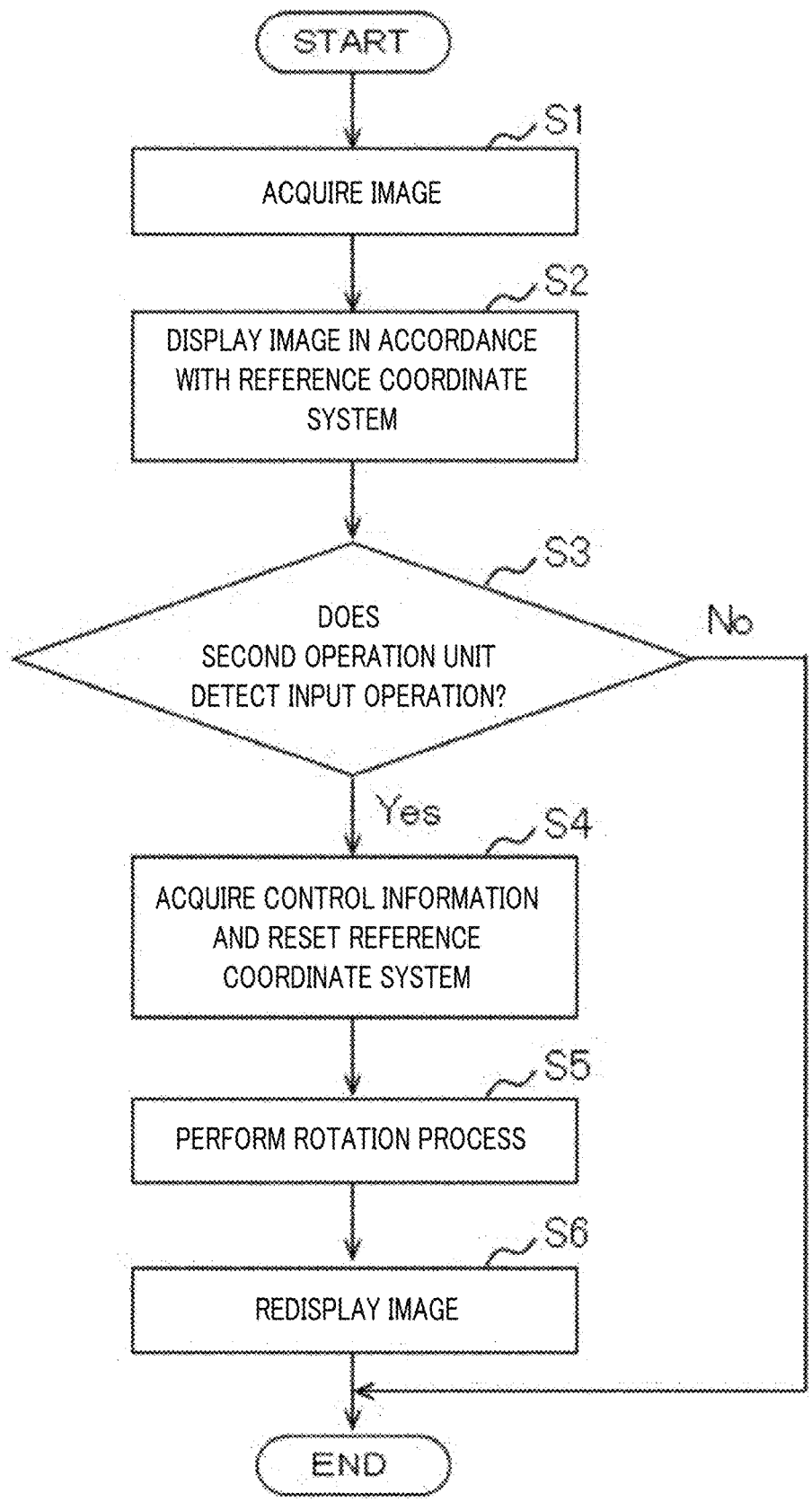
FIG. 14 illustrates an example of a control flowchart in the remote operation terminal according to the present embodiment.

An actual operation of remote operation terminal 32 according to the present embodiment will be described with reference to FIG. 14.

First, when power is turned on in remote operation terminal 32, terminal-side control apparatus 42 acquires an ambient image of crane 1 (Step S1). At this time, terminal-side control apparatus 42 acquires the ambient image as follows. The ambient image is generated, based on the detection information of camera 9b, and is transmitted from crane 1 to remote operation terminal 32 via communication apparatus 22. Then, in remote operation terminal 32, the ambient image is received via terminal-side communication apparatus 41, and is transmitted to terminal-side control apparatus 42. In this manner, terminal-side control apparatus 42 acquires the ambient image of crane 1. Normally, terminal-side control apparatus 42 also acquires the information of the reference coordinate system of the image when acquiring the ambient image. Then, either terminal-side control apparatus 42 or control apparatus 31 sets the reference coordinate system for associating the direction in the image, the operation direction of suspended load movement operation tool 35, and the movement direction of main hook block 10 with each other.

Next, terminal-side control apparatus 42 controls terminal-side display apparatus 40 to display the acquired image in accordance with the reference coordinate system (Step S2).

Next, terminal-side control apparatus 42 determines whether or not the input operation is detected in operation (rotation) direction detection section 34a, operation (rotation) speed detection section 34b, and operation (rotation) amount detection section 34c of reference change operation tool 34 (Step S3). At this time, terminal-side control apparatus 42 detects and determines the input operation, based on the input information (input signal) transmitted from respective detection sections 34a, 34b, and 34c, for example.

As a result, in a case where terminal-side control apparatus 42 determines that the input operation is not detected (Step S3: No), terminal-side control apparatus 42 determines that reference change operation tool 34 is not operated, and does not perform processes in Steps S4 to Step S6. In this manner, an image rotation operation process is completed without rotating the image. After the process is completed, crane 1 is brought into a remotely operable state by operating remote operation terminal 32. On the other hand, in a case where terminal-side control apparatus 42 determines that the input operation is detected (Step S3: Yes), terminal-side control apparatus 42 acquires the control information (operation command signal) based on the input operation from reference change operation tool 34, and resets the reference coordinate system, based on the detection information (the rotation direction, the rotation speed, and the rotation amount) (Step S4). The control information includes the control information relating to a process for rotating the image displayed on terminal-side display apparatus 40 and a reference coordinate system resetting process for associating the direction of the image corresponding to the rotation of the image, the operation direction of the suspended load movement operation tool 35, and the movement direction of main hook block 10 with each other.

Terminal-side control apparatus 42 rotates and resets the reference coordinate system in accordance with the operation direction (rotation direction) and the operation amount (rotation amount) which are included in the control information. More specifically, in a case where the operation direction is the "rightward direction" and the operation amount is "90°", terminal-side control apparatus 42 rotates the reference coordinate system as much as 90° in the rightward direction, and resets the reference coordinate system.

Thereafter, terminal-side control apparatus 42 performs the rotation process on the image, based on the acquired control information (Step S5). Terminal-side control apparatus 42 rotates the image in accordance with the operation direction (rotation direction) and the operation amount (rotation amount) which are included in the control information. More specifically, in a case where the operation direction is the "rightward direction" and the operation amount is "90°", the terminal-side control apparatus 42 rotates the image as much as 90° in the rightward direction.

The rotation angle of the image and the reference coordinate system can set to any desired value by operating reference change operation tool 34 as long as the rotation angle falls within a range of 0° to 360°.

Next, terminal-side control apparatus 42 controls on terminal-side display apparatus 40 to display the image subjected to the rotation process (Step S6). Thereafter, the image rotation operation process is completed. After the process is completed, crane 1 is brought into a remotely operable state by operating the remote operation terminal 32.

Operation & Advantageous Effect

Embodiment 3

Advantageous effects of remote operation terminal 32 according to the present embodiment will be described with reference to FIGS. 15 to 17.

Figure 15A:
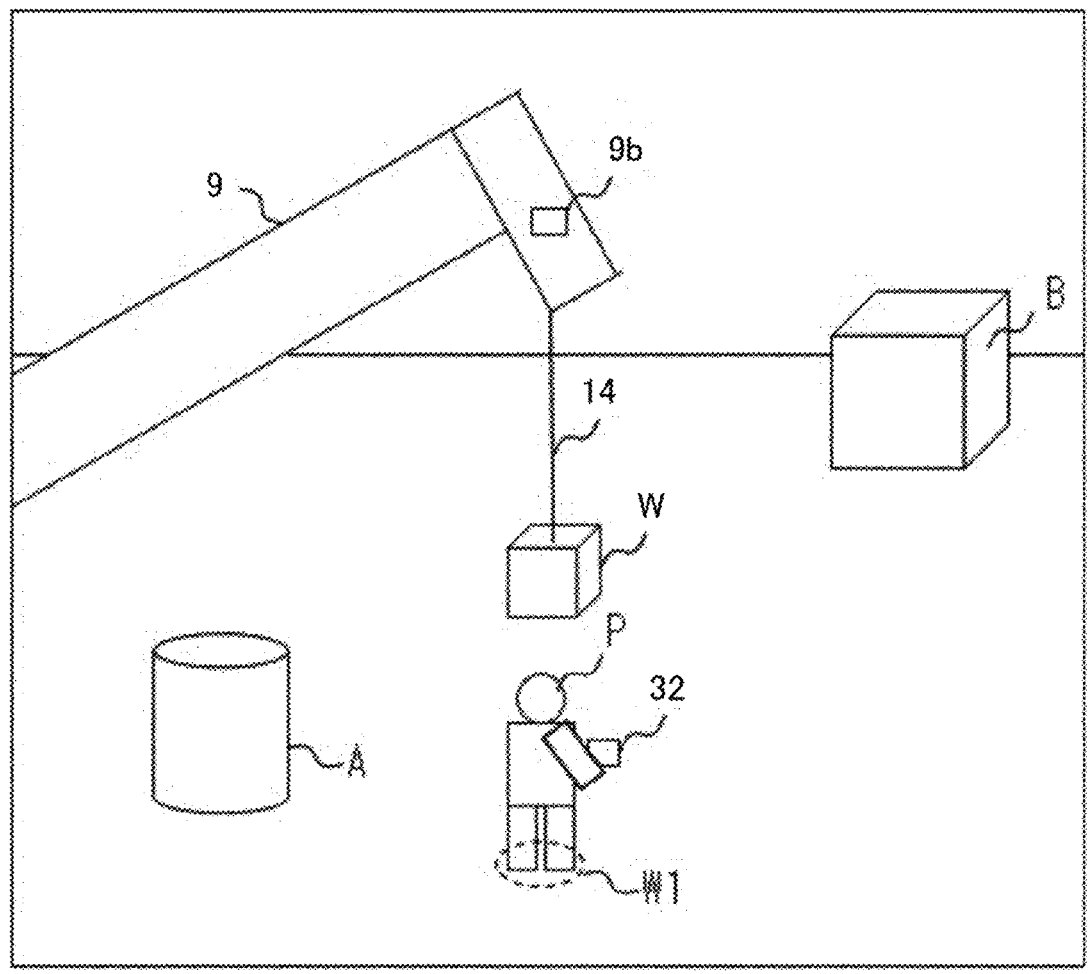
FIG. 15A illustrates an example of a perspective view of a work site.
Figure 15B:
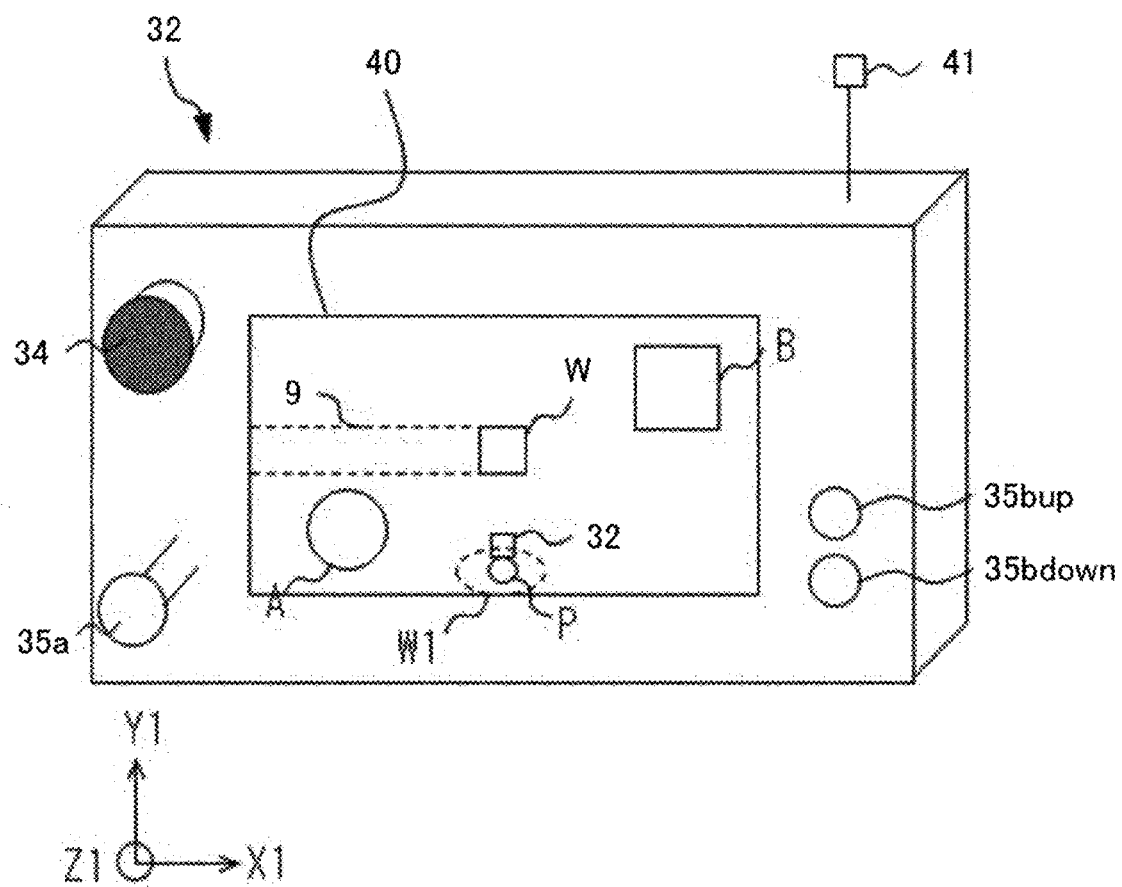
FIG. 15B illustrates an example of a view for describing image display in the remote operation terminal according to the present embodiment.
Figure 16A:
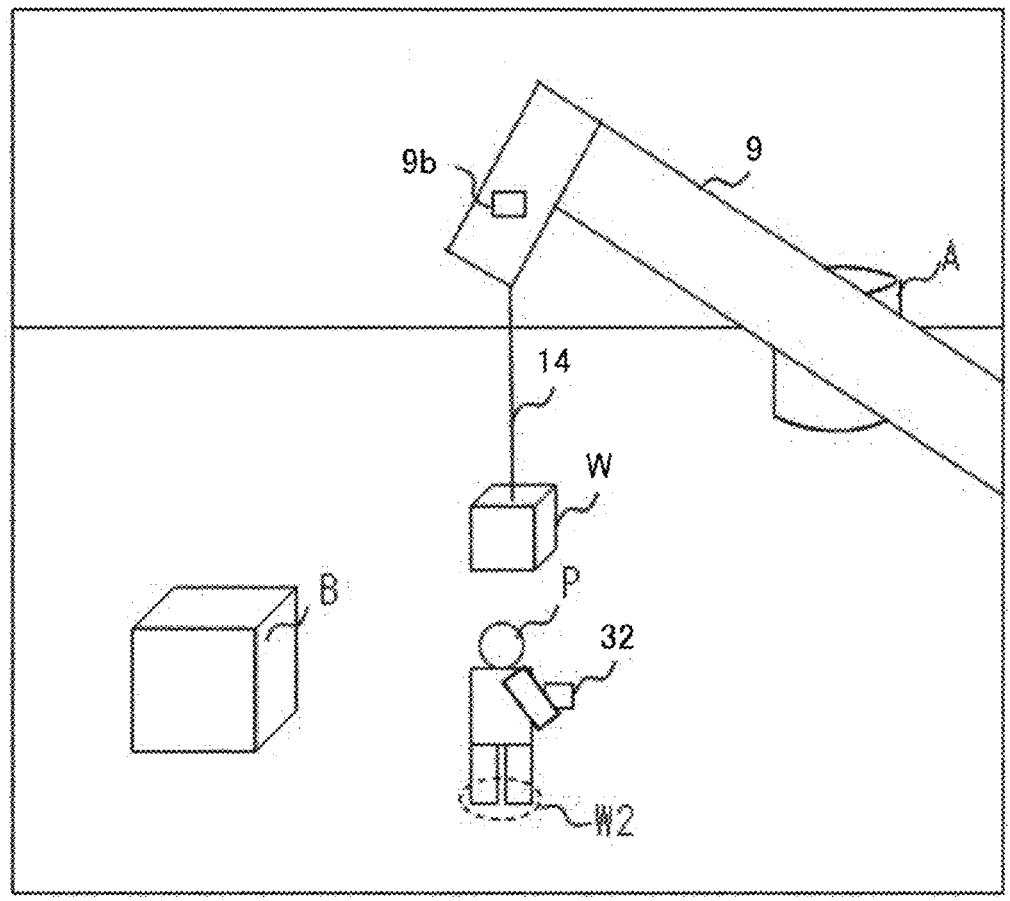
FIG. 16A illustrates another example of the perspective view of the work site.

As a specific embodiment, as illustrated in FIGS. 15A and 16A, for example, a case will be described where operator P moves load W to an upper surface of target B at a work site having obstacle A. Here, operator P performs work at working position W1 in FIG. 15A, and performs work at working position W2 in FIG. 16A. In addition, in FIGS. 15B, 16B, and 16C, the image displayed on terminal-side display apparatus 40 of remote operation terminal 32 is an example of the image captured from above in the vertical direction by camera 9b serving as the detection apparatus. In order to simplify the description of the present embodiment, the movement of load W in the vertical direction is not considered in the description.

Normally, the reference coordinate system is set in the image detected by camera 9b, and the reference coordinate system corresponds to the reference coordinate system of the operation system of remote operation terminal 32. Therefore, in a case where load W is moved to the upper surface of target B at the work site illustrated in FIG. 15A, after load W is moved as much as a predetermined amount in a direction X1, the load W needs to be moved as much as a predetermined amount in direction Y1. As a matter of course, this order may be reversed, and after load W is moved as much as the predetermined amount in direction Y1, load W may be moved as much as the predetermined amount in direction X1. However, the configuration will be omitted in order to simplify the description. In addition, in order to simplify the description of the present embodiment, a configuration has been described in which operation stick 35a is pulled down so as to move load W in direction X1 or in direction Y1. However, operation stick 35a may be pulled down as much as a predetermined amount in an oblique direction so that load W is linearly moved to the upper surface of target B in the oblique direction.

On the other hand, operator P who directly faces terminal-side display apparatus 40 of remote operation terminal 32 moves load W as much as the predetermined amount in the rightward direction in a status illustrated in FIG. 15A. Thereafter, operator P considers that load W needs to be moved as much as the predetermined amount in the rearward direction. In this case, in the actual work, after operation stick 35a is pulled down in the rightward direction (that is, the direction X1), operation stick 35a is pulled down in the rearward direction (that is, the direction Y1), thereby completely carrying out the work.

However, as illustrated in FIG. 16A, it is assumed that operator P moves load W from work position W1 to work position W2 due to some reasons before carrying out this work.

In a case where the load W is moved to the upper surface of target B (by using the shortest distance) at the work site illustrated in FIG. 16A, load W needs to be moved as much as the predetermined amount in direction Y1 after being moved as much as the predetermined amount in direction X1.

On the other hand, operator P who directly faces terminal-side display apparatus 40 of remote operation terminal 32 moves load W as much as the predetermined amount in the leftward direction in a status illustrated in FIG. 16A. Thereafter, operator P considers that load W needs to be moved as much as the predetermined amount in the forward direction. However, in the actual work, after operation stick 35a is pulled down in the rightward direction (that is, direction X1), operation stick 35a is pulled down in the rearward direction (that is, direction Y1). In this manner, operator P needs to complete the work.

In this way, in the work performed using the remote operation, a relative positional relationship between the work vehicle and remote operation terminal 32 is constantly changed. Therefore, in some cases, the direction of load W actually viewed by the operator himself or herself in the work site may not coincide with the direction of the image displayed on remote operation terminal 32 (and the operation direction). In this case, operator P operates remote operation terminal 32 while carefully considering the movement direction of the suspended load based on the work vehicle.

When the work is performed using the work vehicle of crane 1, as in the swivel of the crane or the posture change of the operator (at the same position), the relative positional relationship between the work vehicle and remote operation terminal 32 is rapidly changed. Therefore, there is a problem in that the working time is lengthened and working efficiency becomes poor.

However, remote operation terminal 32 according to the present embodiment has reference change operation tool 34 for rotationally operate the image displayed on terminal-side display apparatus 40. Then, in a case where the image is rotated in accordance with the input operation of reference change operation tool 34, terminal-side control apparatus 42 rotates the reference coordinate system in the same rotation direction and as much as the same rotation amount as the rotation direction and the rotation amount of the image.

Figure 16B:
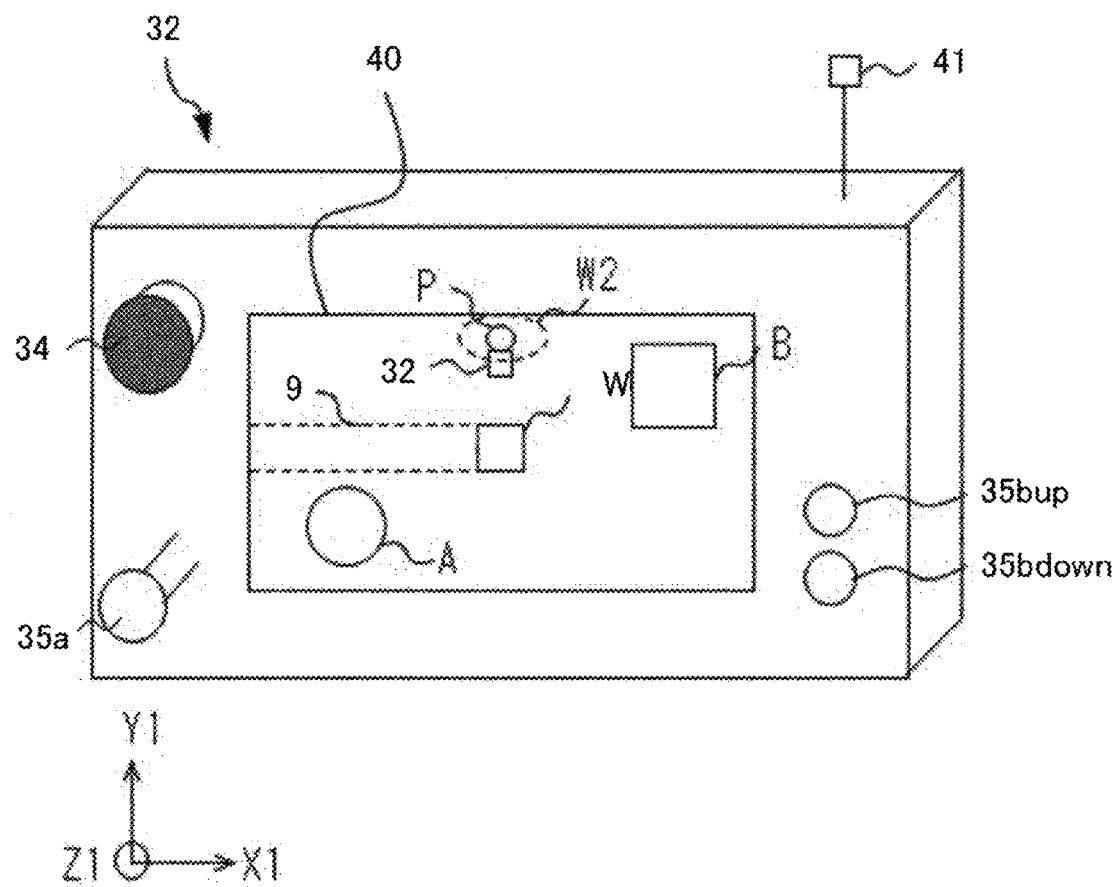
FIG. 16B illustrates another example of the view for describing the image display in the remote operation terminal according to the present embodiment.
Figure 16C:
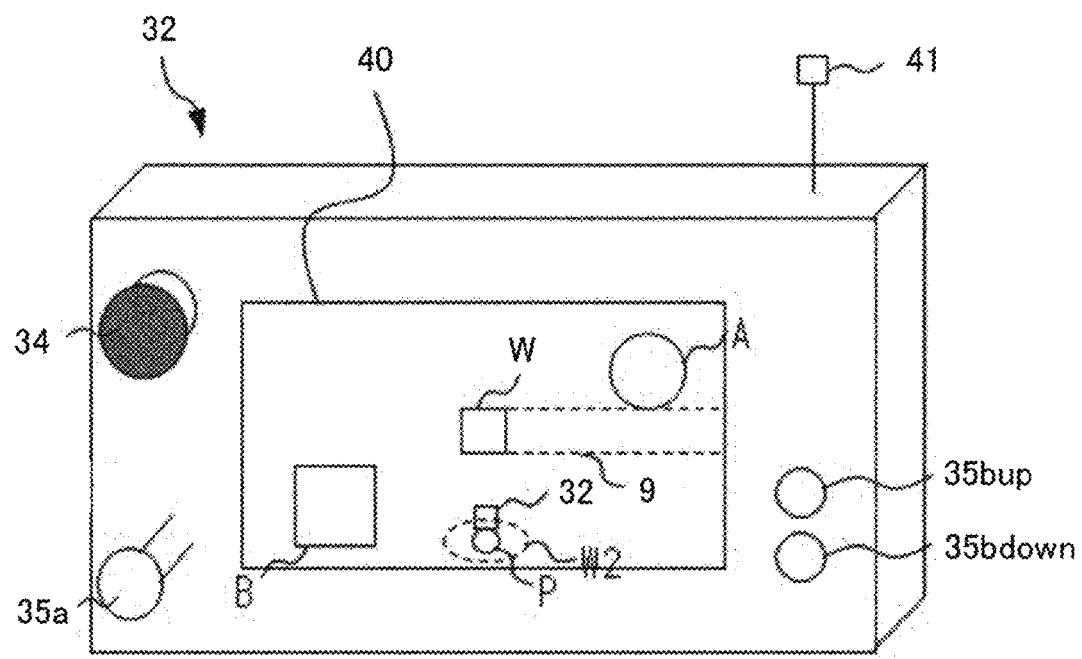
FIG. 16C illustrates still another example of the view for describing the image display in the remote operation terminal according to the present embodiment.
Figure 16C:
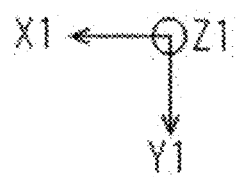
Figure 17:
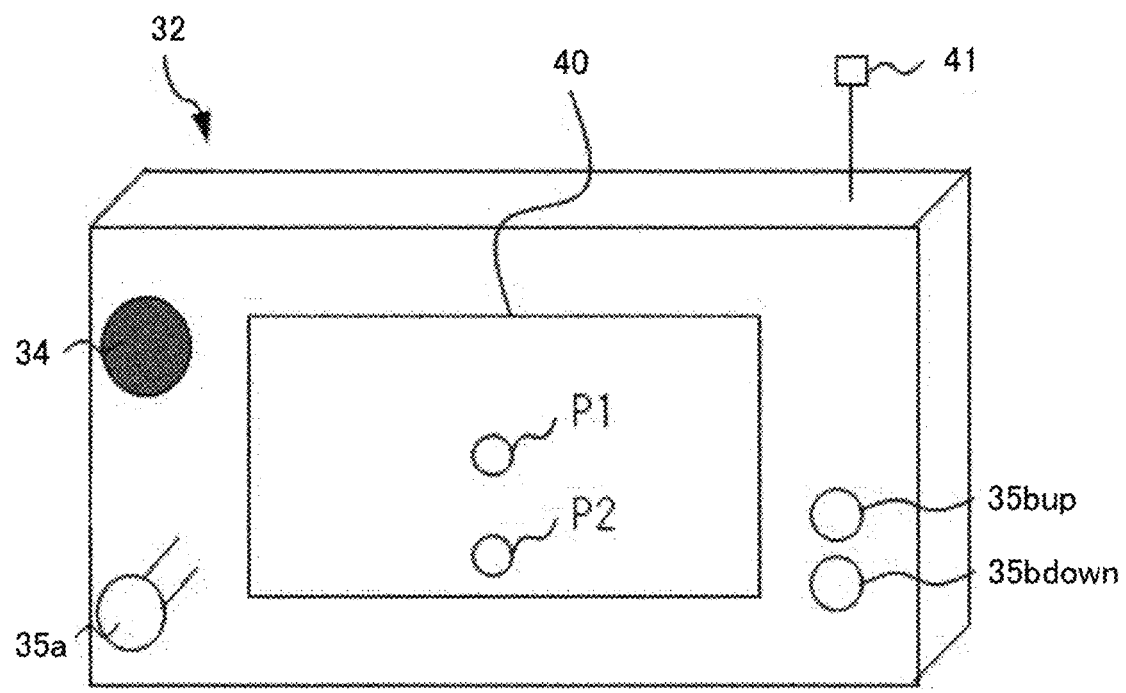
FIG. 17 illustrates still another example of the view for describing the image display in the remote operation terminal according to the present embodiment.

Therefore, reference change operation tool 34 is operated in the work site illustrated in FIG. 16A. In this manner, as illustrated by terminal-side display apparatus 40 in FIG. 16C, a display position of operator P can be moved to a lower side position of the screen of terminal-side display apparatus 40, for example. That is, the image illustrated in FIG. 16C is an image obtained in such a way that the image displayed on terminal-side display apparatus 40 illustrated in FIG. 16B is rotated as much as 180° on an XY plane. In this case, the reference coordinate system is also rotated in the XY plane.

As a result, operator P moves load W as much as the predetermined amount in the leftward direction. Thereafter, while operator P considers that load W needs to be moved as much as the predetermined amount in the forward direction, operator P pulls down operation stick 35a in the leftward direction (that is, direction X1). Thereafter, operator P pulls down operation stick 35a in the forward direction (that is, direction Y1), thereby completely carrying out the work. As a result, the movement direction of load W actually viewed by operator P coincides with the operation direction of remote operation terminal 32. Accordingly, operator P can perform an accurate remote operation by easily and simply operating remote operation terminal 32.

Embodiment 4

As an application embodiment of reference change operation tool 34 of remote operation terminal 32, a setting button (in the present embodiment, reference change operation tool 34) may be located in order to rotate the image displayed on terminal-side display apparatus 40 and in order to stop the rotation of the image displayed on terminal-side display apparatus 40.

The present embodiment will be described with reference to a more specific example. For example, a detection apparatus including a first sensor for detecting the position information is located above load W in the vertical direction. In addition, a second sensor for detecting the position information is disposed in remote operation terminal 32. Then, as illustrated in FIG. 17, in terminal-side display apparatus 40, a position of the first sensor is displayed at first reference position P1, and a position of the second sensor is displayed at second reference position P2.

The respective positions of remote operation terminal 32 and load W which are detected by both the sensors are displayed on terminal-side display apparatus 40. In this manner, operator P can recognize the positional relationship between remote operation terminal 32 and load W from terminal-side display apparatus 40. Therefore, operator P presses reference change operation tool 34 so that the positional relationship between remote operation terminal 32 and load W which are displayed on terminal-side display apparatus 40 is optimized for remotely operating the work vehicle. In this manner, operator P can rotate the image displayed on terminal-side display apparatus 40.

Here, in general, operator P tends to easily carry out the work in a case where load W is located at the center position of terminal-side display apparatus 40 and remote operation terminal 32 is located at the lower center position of terminal-side display apparatus 40. Therefore, as a preferred embodiment, operator P first rotates the image displayed on terminal-side display apparatus 40 by pressing reference change operation tool 34. As illustrated in FIG. 17, when first reference position P1 is located at the center of the display region of terminal-side display apparatus 40 and second reference position P2 is located in the vicinity of the lower center of terminal-side display apparatus 40, it is preferable to stop the rotation of the image by pressing reference change operation tool 34 again.

In the present embodiment, an embodiment has been described in which the image is rotated by pressing reference change operation tool 34 and the rotation of the image is stopped by pressing reference change operation tool 34 again. However, the present invention is not limited to this configuration. For example, the image may be rotated while reference change operation tool 34 is pressed, and the rotation of the image may be stopped when the pressing of reference change operation tool 34 is stopped.

In addition, a configuration may be adopted as follows. The image displayed on terminal-side display apparatus 40 is automatically rotated and adjusted so that the image is located at a position where operator P described above easily performs the work. Specifically, the image may be rotated by pressing reference change operation tool 34. As described above with reference to FIG. 17, the rotation of the image may be stopped when first reference position P1 is located at the center of the display region of terminal-side display apparatus 40 and second reference position P2 is located in the vicinity of the lower center of terminal-side display apparatus 40.

According to the above-described respective embodiments, terminal-side control apparatus 42 also rotates the reference coordinate system in the same rotation direction and as much as the same rotation amount as the rotation direction and the rotation amount of the image rotated by reference change operation tool 34. In this manner, the movement direction of load W actually viewed by operator P coincides with the operation direction of remote operation terminal 32. Accordingly, operator P can perform an accurate remote operation by easily and simply operating remote operation terminal 32.

Embodiment 5

As described above, it is preferable that a position for attaching camera 9b is located above main hook block 10 in the vertical direction. Therefore, it is preferable that camera 9b is attached to the distal end portion of boom 14 located above main hook block 10 in the vertical direction.

In this case, boom 14 is rotationally moved around crane 1 by the swivel operation of crane 1, and at the same time, camera 9b is also rotated. Accordingly, the image displayed on terminal-side display apparatus 40 is also rotated. Therefore, it is preferable that remote operation terminal 32 according to the present embodiment has a function to correct the rotation of the image displayed on terminal-side display apparatus 40 along with the swivel operation of crane 1.

Figure 18A:
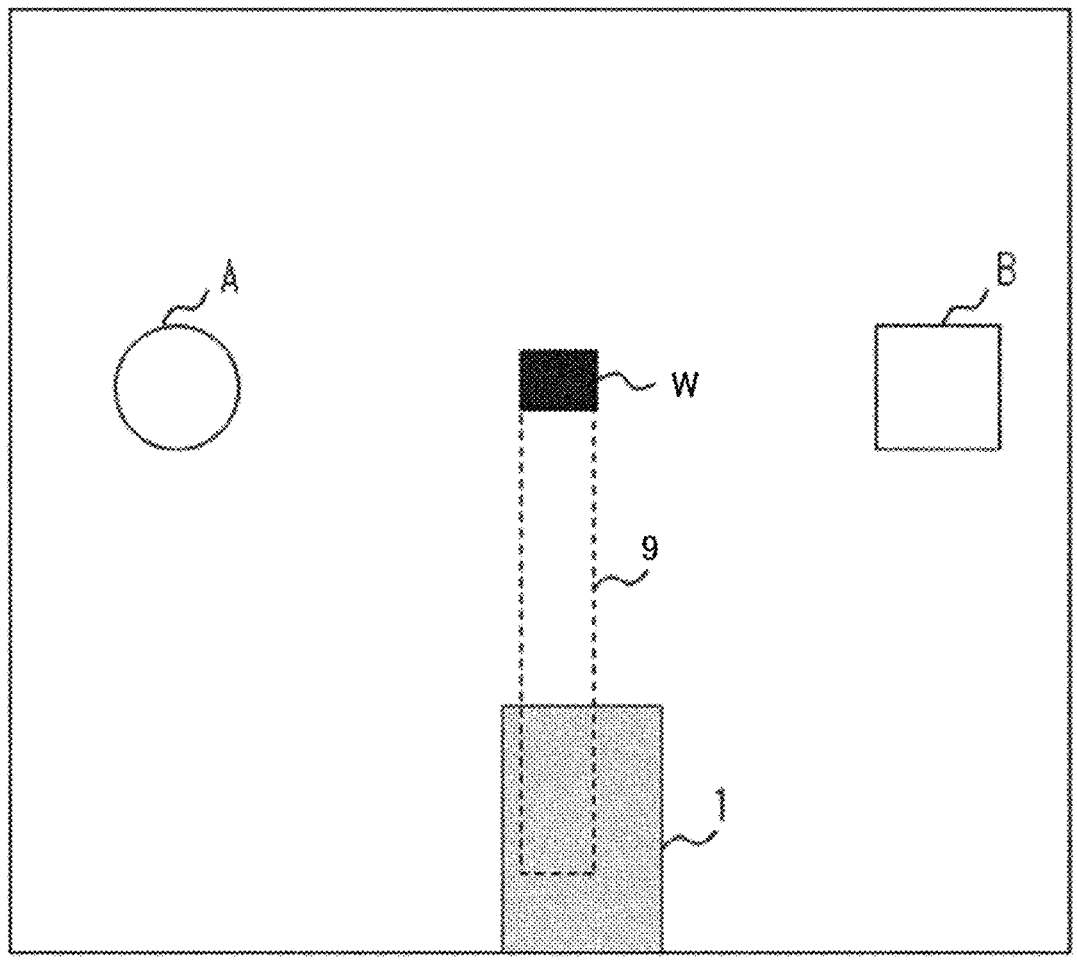
FIG. 18A illustrates an example of a top view of the work site.

More specific embodiments will be described with reference to FIGS. 18 to 19. As illustrated in FIG. 18A, an example will be described where obstacle A and obstacle B are present in the work site. In this example, camera 9b (not illustrated) is located above load W.

Figure 18B:
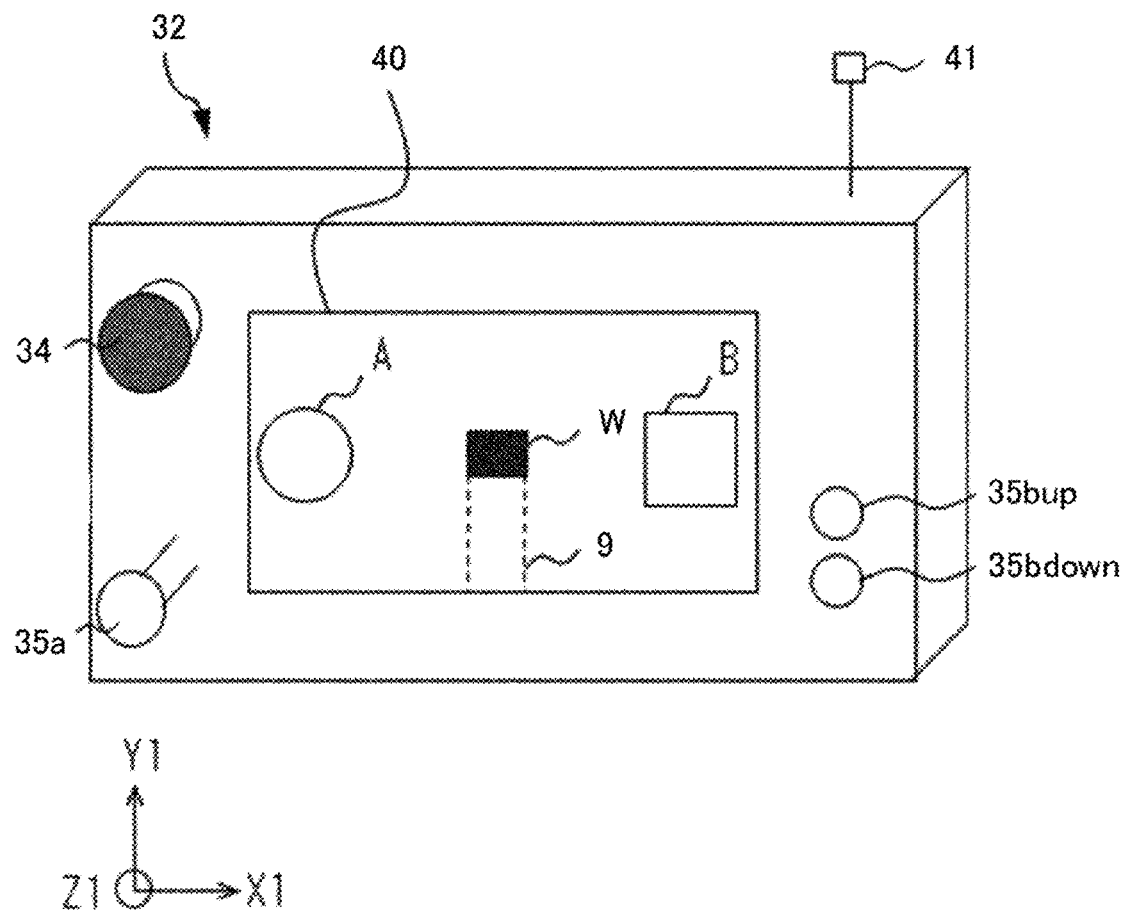
FIG. 18B illustrates still another example of the view for describing the image display in the remote operation terminal according to the present embodiment.

In the work site illustrated in FIG. 18A, obstacle A is located in the direction opposite to direction X1 with respect to load W (that is, the leftward direction in FIG. 18A), and obstacle B is located on the side in direction X1 with respect to load W (that is, the rightward direction in FIG. 18A). Then, as illustrated in FIG. 18B, in a case where load W is moved to obstacle A, the operator who operates remote operation terminal 32 pulls down operation stick 35a in the direction opposite to direction X1 (that is, the leftward direction in FIG. 18B). On the other hand, in a case where load W is moved to obstacle B, the operator who operates remote operation terminal 32 pulls down operation stick 35a in direction X1 (that is, the rightward direction in FIG. 18B). In other words, in a case where FIGS. 18A and 18B are horizontally viewed, the upward direction, the downward direction, the rightward direction, and the leftward direction coincide with each other in FIGS. 18A and 18B.

Figure 19A:
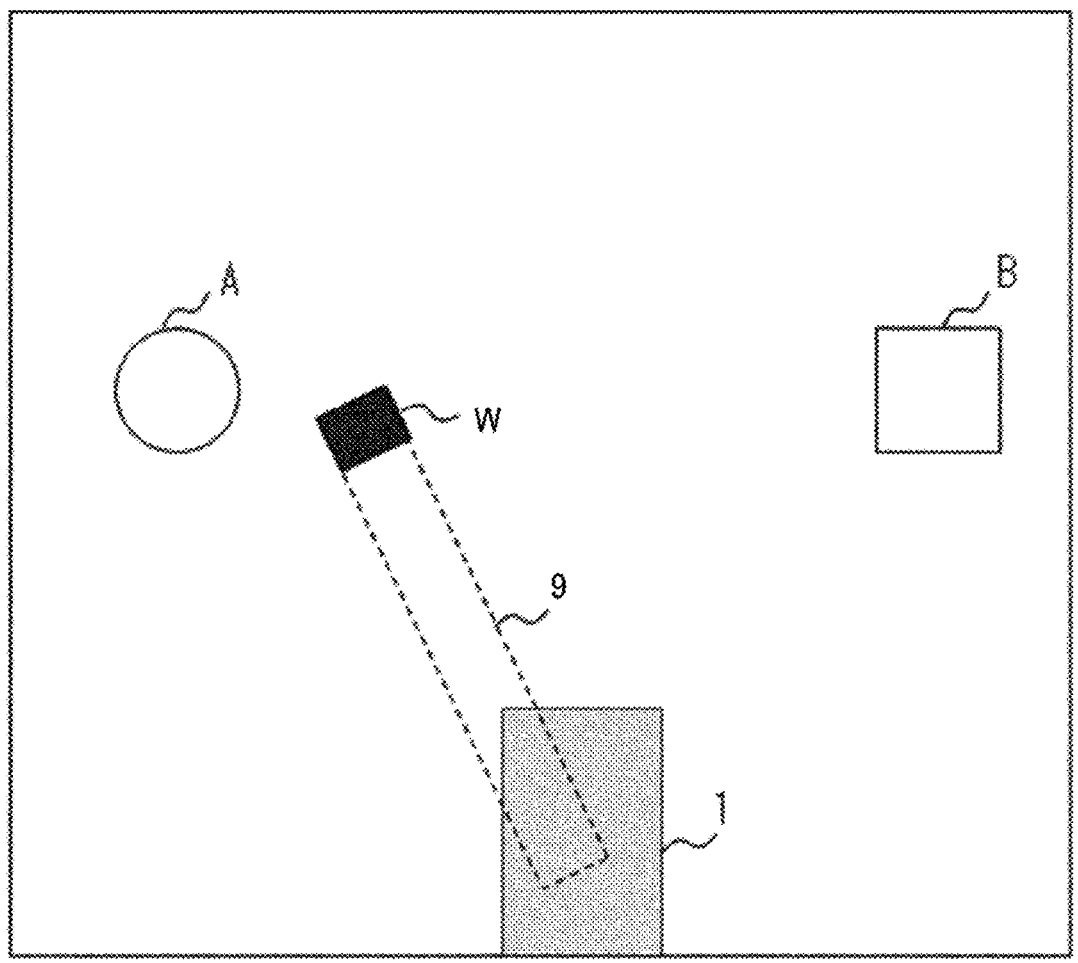
FIG. 19A illustrates another example of the top view of the work site.
Figure 19B:
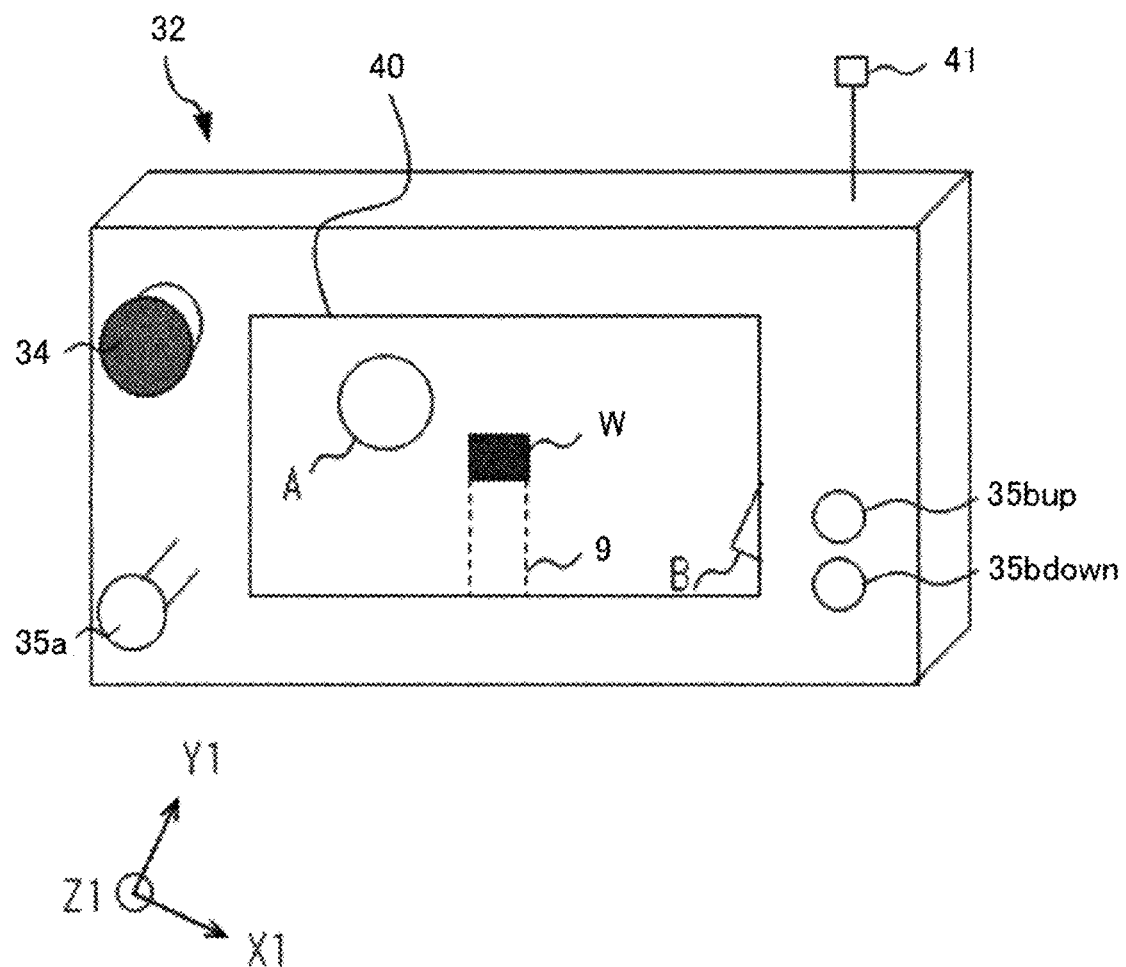
FIG. 19B illustrates still another example of the view for describing the image display in the remote operation terminal according to the present embodiment.

Next, as illustrated in FIG. 19A, in the work site illustrated in FIG. 18A, it is assumed that boom 14 is caused to swivel counterclockwise at a predetermined angle (in the example illustrated in FIG. 19A, the boom 14 is caused to swivel counterclockwise at 25 degrees). In the present embodiment, camera 9b is attached to boom 14. Accordingly, as boom 14 swivels, camera 9b is also rotated. Therefore, an angular deviation corresponding to the swivel angle occurs between the direction in the work site illustrated in FIG. 19A and the direction of the image displayed on terminal-side display apparatus 40 illustrated in FIG. 19B. Specifically, direction Y1 (upward direction) illustrated in FIG. 19A is the upward direction in the example illustrated in FIG. 18B. However, direction Y1 in the example illustrated in FIG. 19B is the obliquely upward and rightward direction. Direction X1 (rightward direction) illustrated in FIG. 19A is the rightward direction in the example illustrated in FIG. 18B. However, direction X1 in the example illustrated in FIG. 19B is the obliquely downward and rightward direction. In other words, in a case where FIGS. 19A and 19B are horizontally viewed, the upward direction, the downward direction, the rightward direction, and the leftward direction do not coincide with each other in FIGS. 19A and 19B. Therefore, even in a case where the operator who operates remote operation terminal 32 is not moved, boom 14 swivels. In this manner, in some cases, the direction of load W actually viewed by the operator himself or herself in the work site may not coincide with the direction of the image displayed on remote operation terminal 32 (and the operation direction).

Figure 19C:
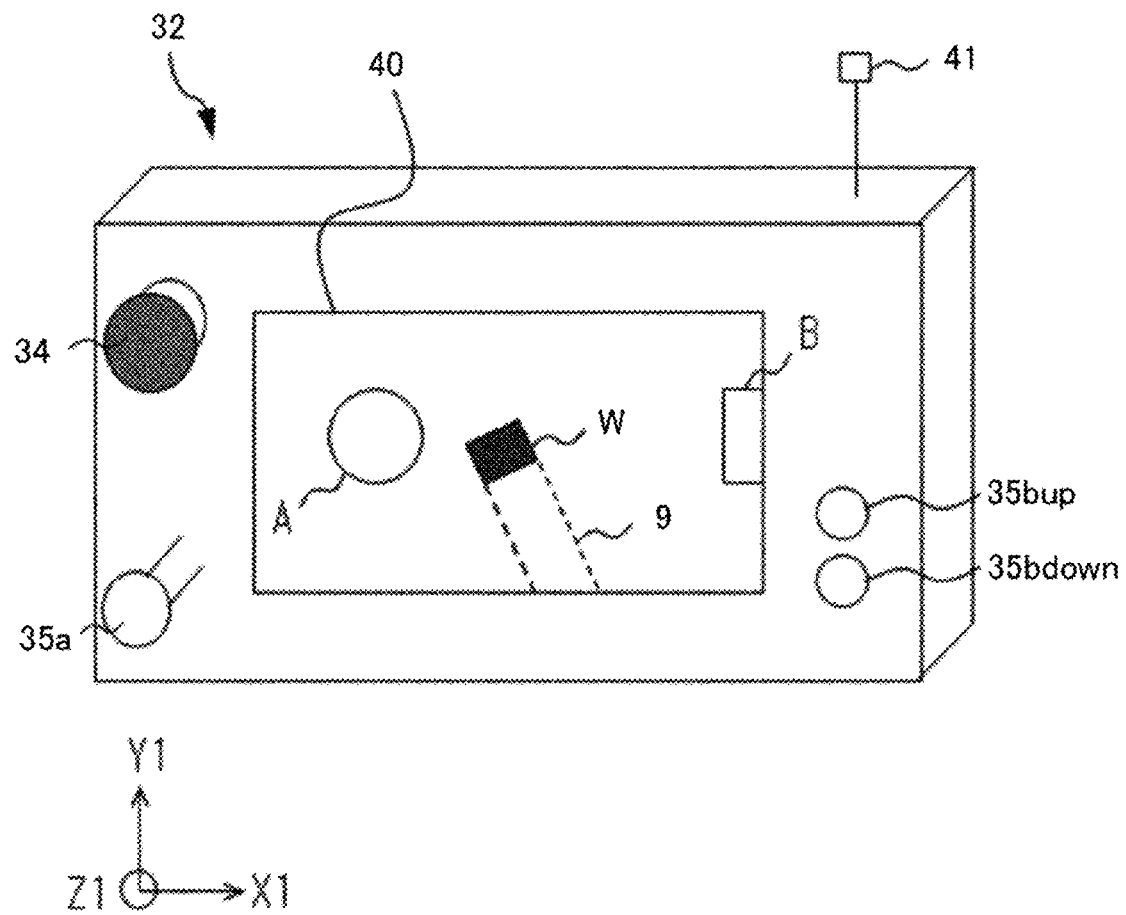
FIG. 19C illustrates still another example of the view for describing the image display in the remote operation terminal according to the present embodiment.

Therefore, according to the present embodiment, in a case where boom 14 performs the swivel operation, terminal-side control apparatus 42 rotates the image displayed on terminal-side display apparatus 40 in the same rotation direction and as much as the rotation amount as the rotation direction and the rotation amount of the swivel operation. As a result, in a case where boom 14 of crane 1 illustrated in FIG. 18A swivels as illustrated in FIG. 19A, the image displayed on terminal-side display apparatus 40 is rotated as illustrated in FIG. 19C. Specifically, direction Y1 (upward direction) illustrated in FIG. 19A is direction Y1 (upward direction) illustrated in FIG. 19C, and direction X1 (rightward direction) illustrated in FIG. 19A is direction X1 (rightward direction) illustrated in FIG. 19C. In other words, when FIGS. 19A and 19C are horizontally viewed, the upward direction, the downward direction, the rightward direction, and the leftward direction coincide with each other in FIGS.

19A and 19C. As a result, the movement direction of load W actually viewed by operator P coincides with the operation direction of remote operation terminal 32. Accordingly, operator P can perform an accurate remote operation by easily and simply operating remote operation terminal 32.

The above-described embodiments represent only typical forms, and can be embodied by various modifications within the scope not departing the gist of the embodiment. As a matter of course, the present invention can be further embodied in various forms, and the scope of the present invention is described in the appended claims. Furthermore, the scope of the appended claims includes equivalent meanings and all modifications within the scope.

INDUSTRIAL APPLICABILITY

The present invention is applicable to a remote operation terminal and a work vehicle including the remote operation terminal.

REFERENCE SIGNS LIST

1 Crane
6 Crane apparatus
31 Control apparatus
32 Remote operation terminal
34 Reference change operation tool
35 Suspended load movement operation tool
42 Terminal-side control apparatus
50 Actuator
60 Control valve
P1 First position
P2 Second position

The invention claimed is:

1. A remote operation terminal for a work apparatus disposed in a work vehicle, the remote operation terminal comprising:
a control circuitry configured to be capable of communicating with a control apparatus of the work apparatus and to control an operation of the remote operation terminal;
a first operation section that remotely operates the work apparatus; and
a second operation section that receives an input operation of inputting a correction angle for correcting an operating direction of the work apparatus operated by an operation of the first operation section, the input operation being performed by changing an operation direction reference with respect to a vehicle direction reference for the work vehicle, wherein
the control circuitry is configured to calculate an operation direction of the work apparatus for an operation of the first operation section, based on the correction angle input, and transmit the operation direction of the work apparatus to the control apparatus.

2. The remote operation terminal according to claim 1, wherein the second operation section sets an angle from the vehicle direction reference for the work vehicle to the operation direction reference for the first operation section as the correction angle.

3. The remote operation terminal according to claim 1, wherein the second operation section sets the vehicle direction reference for the work vehicle and the operation direction reference for the first operation section based on an azimuth or terrain information.

4. The remote operation terminal according to claim 1, further comprising: a display section that displays an image indicating the reference for the work vehicle, wherein
the control circuitry causes the display section to display the image indicating the reference for the work vehicle in conjunction with an operation of the second operation section.

5. A work vehicle comprising:
a remotely operated work apparatus;
the remote operation terminal according to claim 1; and
a control apparatus configured to be capable of communicating with a control circuitry of the remote operation terminal and to control an operation of the work apparatus, wherein
the control apparatus or the control circuitry is configured to calculate an operation direction of the work apparatus with respect to an operation of the first operation section, based on a set value of the second operation section, and
the control apparatus causes the work apparatus to operate in the calculated operation direction.

6. The remote operation terminal according to claim 1 for remotely operating an operation of the work vehicle provided with a detection apparatus, the remote operation terminal further comprising:
a display section for displaying an image generated based on detection information of the detection apparatus, wherein
the control circuitry rotates the operation direction of the work apparatus based on input of the first operation section in response to a rotation direction and a rotation amount which are input by the second operation section, and sets the operation direction of the rotated work apparatus.

7. The remote operation terminal according to claim 6, wherein the image is an image taken by a camera in a vertical direction or is an image based on peripheral detection of the work vehicle.

8. The remote operation terminal according to claim 6, wherein
the work vehicle is a work vehicle that moves a load, and
the control circuitry causes the image to be displayed such that the load is located at a center position of a display region of the display section.

9. The remote operation terminal according to claim 6, further comprising: a display direction fixing section that fixes a display direction of the image to be displayed on the display section, wherein
the control circuitry sets the display direction of the image based on input of the display direction fixing section.

10. The remote operation terminal according to claim 6, wherein the control circuitry rotates the image in response to a swivel direction and/or a swivel amount in a case where the work vehicle performs a swivel operation and causes the rotated image to be displayed on the display section.

11. A remote operation terminal that remotely operates an operation of a work vehicle including a work apparatus, a control apparatus, and a detection apparatus provided with a first sensor configured to detect location information of a load, the remote operation terminal comprising:
a second sensor configured to detect location information of the remote operation terminal;
a control circuitry configured to be capable of communicating with the control apparatus and to control an operation of the remote operation terminal;

a display section for displaying an image generated based on detection information of the detection apparatus; and a first operation section for remotely operating the work apparatus, wherein the control circuitry causes the image to be displayed in such a manner that the detection apparatus is located at a center position of a display region of the display section based on position information of the first sensor, and the remote operation terminal is located at a lower center position of the display region based on position information of the second sensor.

* * * * *